(12) United States Patent
Runge et al.

(10) Patent No.: US 8,151,203 B2
(45) Date of Patent: *Apr. 3, 2012

(54) MANIPULATING A DATA SOURCE USING A GRAPHICAL USER INTERFACE

(75) Inventors: Bernhard M. Runge, Mannheim (DE); Adam Korman, Mannheim, CA (US); Robert S. Lee, Hudson, OH (US)

(73) Assignee: SAP AG, Walldorf (DE)

( * ) Notice: Subject to any disclaimer, the term of this patent is extended or adjusted under 35 U.S.C. 154(b) by 1145 days.

This patent is subject to a terminal disclaimer.

(21) Appl. No.: 11/849,588

(22) Filed: Sep. 4, 2007

(65) Prior Publication Data

US 2007/0300172 A1 Dec. 27, 2007

Related U.S. Application Data

(62) Division of application No. 10/283,328, filed on Oct. 30, 2002, now Pat. No. 7,281,218.

(60) Provisional application No. 60/373,328, filed on Apr. 18, 2002.

(51) Int. Cl.
*G06K 3/00* (2006.01)

(52) U.S. Cl. .......................... 715/769; 715/745

(58) Field of Classification Search .................. 715/769, 715/771–773, 968, 745, 811, 734–739, 744, 715/746–747, 762–763; 709/224; 707/3, 707/101, 102, 104; 705/30
See application file for complete search history.

(56) References Cited

U.S. PATENT DOCUMENTS

| | | | |
|---|---|---|---|
| 5,551,030 A | 8/1996 | Linden et al. | |
| 5,715,413 A | 2/1998 | Ishai et al. | |
| 5,721,900 A | 2/1998 | Banning et al. | |
| 5,832,496 A | 11/1998 | Anand et al. | |
| 5,842,195 A | 11/1998 | Peters et al. | |
| 5,848,424 A | 12/1998 | Scheinkman et al. | |
| 5,870,746 A | 2/1999 | Knutson et al. | |
| 5,930,764 A | 7/1999 | Melchione et al. | |
| 5,966,695 A | 10/1999 | Melchione et al. | |
| 6,026,397 A | 2/2000 | Sheppard | |
| 6,320,586 B1 | 11/2001 | Plattner et al. | |
| 6,356,893 B1 * | 3/2002 | Itakura et al. | 1/1 |
| 6,587,556 B1 | 7/2003 | Judkins et al. | |
| 6,738,736 B1 | 5/2004 | Bond | |
| 6,778,982 B1 * | 8/2004 | Knight et al. | 707/737 |
| 6,859,784 B1 | 2/2005 | van Duyne et al. | |
| 6,957,186 B1 | 10/2005 | Guheen et al. | |
| 7,139,729 B2 * | 11/2006 | Nault | 705/30 |

(Continued)

FOREIGN PATENT DOCUMENTS

EP 0703540 3/1996

(Continued)

*Primary Examiner* — Steven Sax
(74) *Attorney, Agent, or Firm* — Fish & Richardson P.C.

(57) ABSTRACT

A target audience for a marketing campaign is selected using a graphical user interface. A first graphical representation of a customer data attribute is dragged from a first window and dropped in a second window. A second graphical representation of a customer data attribute is dragged near the graphical representation of an initial profile that is created in the second window in response to the dropping of the first graphical representation. The second graphical representation is dropped in an action area presented when the second graphical representation is dragged near the graphical representation of the initial profile.

4 Claims, 27 Drawing Sheets

U.S. PATENT DOCUMENTS

| | | | |
|---|---|---|---|
| 7,251,693 B2 * | 7/2007 | Stull et al. | 709/225 |
| 7,461,077 B1 * | 12/2008 | Greenwood | 1/1 |
| 7,480,867 B1 * | 1/2009 | Racine et al. | 715/744 |
| 2001/0022592 A1 | 9/2001 | Alimpich et al. | |
| 2002/0054155 A1 | 5/2002 | Churchill et al. | |
| 2002/0087887 A1 | 7/2002 | Busam et al. | |
| 2002/0140731 A1 | 10/2002 | Subramaniam et al. | |
| 2002/0188527 A1 | 12/2002 | Dillard et al. | |
| 2003/0051033 A1 | 3/2003 | Kusumoto et al. | |
| 2003/0071843 A1 * | 4/2003 | Hoff et al. | 345/763 |
| 2003/0076342 A1 | 4/2003 | Cole et al. | |
| 2004/0107125 A1 | 6/2004 | Guheen et al. | |
| 2005/0065845 A1 | 3/2005 | DeAngelis | |
| 2007/0061450 A1 | 3/2007 | Burnley et al. | |
| 2007/0094698 A1 * | 4/2007 | Bountour et al. | 725/132 |

FOREIGN PATENT DOCUMENTS

| | | |
|---|---|---|
| WO | 99/45489 | 9/1999 |
| WO | 01/46891 | 6/2001 |
| WO | 02/23428 | 3/2002 |

* cited by examiner

MANIPULATING A DATA SOURCE USING A GRAPHICAL USER INTERFACE

CROSS REFERENCE TO RELATED APPLICATIONS

This application is a divisional (and claims the benefit of priority under 35 U.S.C. §120) of U.S. application Ser. No. 10/283,328, filed on Oct. 30, 2002, now allowed, and titled MANIPULATING A DATA SOURCE USING A GRAPHICAL USER INTERFACE, which claims priority from U.S. Provisional Application No. 60/373,328, filed Apr. 18, 2002, and titled MANIPULATING A DATA SOURCE USING A GRAPHICAL USER INTERFACE.

TECHNICAL FIELD

This document relates to manipulating a data source using a graphical user interface.

BACKGROUND

A database management system typically is used to store, manage, and manipulate a data source. The database management system typically supports a query language or other programming languages with which a user can manipulate data of the data source. Users of the data source typically include individuals who are not familiar with the storage and management structure of the data source. Many data source users work in areas that require them to access and manipulate the data source on a daily basis; however, a substantial number of users lack the skills and the substantial knowledge needed to use the query language or other programming languages that typically are used to manipulate the data source. For example, marketing professionals routinely need to manipulate data within a data source for marketing campaigns and other marketing tasks but may not possess the skills to perform the required data source manipulation to meet their marketing segmentation needs.

SUMMARY

In one general aspect, a target audience for a marketing campaign is selected using a graphical user interface. A first graphical representation of a customer data attribute is dragged from a first window and dropped in a second window. A second graphical representation of a customer data attribute is dragged near the graphical representation of an initial profile that is created in the second window in response to the dropping of the first graphical representation. The second graphical representation is dropped in an action area presented when the second graphical representation is dragged near the graphical representation of the initial profile. Implementations may include one or more of the following features. For example, the first window may include a components window having a list of one or more customer data attributes. The first window also may include a workspace window having a graphical display of one or more customer data attributes. An action may be selected to create a list of customers.

The action area may include one or more action areas that graphically represent a Boolean operation to be performed on the initial profile. The Boolean operation associated with the action area may include a refine operation, a split operation, and/or a complement operation.

In one implementation, when the second graphical representation is dropped in the action area, the initial profile is narrowed. In another implementation, when the second graphical representation is dropped in the action area, the initial profile is split into one or more profiles.

In another general aspect, selecting a target audience for a marketing campaign using a graphical user interface includes creating an initial audience profile in a window on a display represented by a graphical representation. The initial audience profile is updated by dragging a data attribute near the graphical representation of the initial audience profile, picking an action area from one or more action areas that are presented when the data attribute is dragged near the graphical representation, and dropping the data attribute in the picked action area.

Implementations may include one or more of the following features. For example, the initial audience profile may be created by a user action. Additionally or alternatively, the initial audience profile may be created by a default action.

The initial audience profile may be narrowed by dragging, picking, and dropping the data attribute into one of the action areas presented near the graphical representation. The action areas may include a menu window centered on the graphical representation which opens up when the data attribute is dragged near the graphical representation. The menu window may be divided into one or more portions with each portion serving as an action area. The menu window may be circular.

A list of names with corresponding contact information may be generated from the updated audience profile.

In another general aspect, selecting a target audience for a marketing campaign using graphical representations in a graphical user interface includes graphically representing at least one of a first data attribute and a second data attribute on a display. Each of the data attributes represents valid entries for one or more fields from a data source that has one or more records. A first received user input causes the first data attribute to be dragged and dropped in a window on the display. In response to the first user input, a graphical representation of records from the data source that include the first data attribute is created. A second received user input causes the second data attribute to be dragged in the window on the display. One or more action areas associated with the graphical representation in the window is presented as the second data attribute is dragged near the graphical representation. A third received user input causes the second data attribute to be dropped in one of the action areas. In response to the third user input that causes the second data attribute to be dropped, the graphical representation of the records from the data source is updated based on the action area in which the second data attribute was dropped.

Implementations may include one or more of the following features. For example, the graphical representation may illustrate a number of the records from the data source that include the first data attribute. An action area may graphically represent a Boolean operation to be performed on the records from the data source that include the first data attribute relative to records from the data source that include the second data attribute. The Boolean operation associated with the action area may include a refine operation, a split operation, and/or a complement operation.

The updated graphical representation may provide real-time feedback as to a number of the records from the data source represented by the updated graphical representation. A menu window that is centered on the graphical representation of records may open up when a data attribute is dragged near the graphical representation. The menu window may be divided into one or more portions with each portion serving as an action area. The menu window may be circular. The circular menu window may be centered on the graphical representation and may be divided into one or more portions that each serve as an action area. One or more action areas may be presented based on the most probable actions needed. The action areas presented may depend on a type of the graphical representation created and the data attribute being dragged near the graphical representation.

A graphic of a data attribute category having one or more data attributes may be displayed in a window on the display. The graphic indicates a relative size of a number of records from the data source for each data attribute contained in the data attribute category. Additional received user inputs may cause additional data attributes to be dragged near the graphical representation and dropped in an action area presented near the graphical representation. The graphical representation may be updated in response to the additional data attributes.

The graphical representation of the records from the data source may include a profile of customers for a marketing campaign. The updated graphical representation may include a target group of customers for the marketing campaign.

In yet another general aspect, a graphical user interface (GUI) for selecting a target audience for a marketing campaign using graphical representations includes a first window of a display that includes a first graphical representation of a first data attribute and a second graphical representation of a second data attribute. The first and the second graphical representations represent valid entries for one or more fields from a data source having one or more records. The GUI includes a second window of the display to which the first graphical representation is dragged and dropped to create a third graphical representation that represents a number of records from the data source that include the first data attribute and to which the second graphical representation is dragged and dropped in an action area presented as the second representation is dragged near the third graphical representation to update the third graphical representation based on the action area in which the second graphical representation is dropped.

Implementations may include one or more of the following features. For example, the action area may include a graphic representation of a Boolean operation. The action area may include a refine operation, a split operation, and/or a complement operation. The second window may provide real-time feedback as to a number of the records from the data source represented by the third graphical representation.

The action area may include a menu window centered on the third graphical representation which opens up when the second graphical representation is dragged near the third graphical representation. The menu is divided into one or more portions that serve as action areas. The menu window may be circular. The action area presented may be based on the most probable action needed.

In another general aspect, selecting a target audience for a marketing campaign using graphical representations in a graphical user interface may include graphically representing a first data attribute and a second data attribute on a display, with each of the data attributes representing valid entries for one or more fields from a data source having one or more records. A first received user input may cause the first data attribute to be dragged and dropped in a window on the display. In response to the first user input, a graphical representation may be created that illustrates a number of records from the data source that include the first data attribute. A second received user input may cause the second data attribute to be dragged and dropped in the window on the display. In response to the second user input, an action may be performed based on the graphical representation and the second data attribute. The graphical representation may be updated to provide real-time feedback as to the number of records from the data source represented by the updated graphical representation.

Implementations may include one or more of the following features. For example, one or more action areas associated with the graphical representation in the window may be presented as the second data attribute is dragged near the graphical representation. The second user input may cause the second data attribute to be dropped in one of the action areas and the action performed may be based on the action area in which the second data attribute was dropped.

In another general aspect, a graphical user interface (GUI) for selecting a target audience for a marketing campaign using graphical representations includes a components window that includes a data source indicator, a list of one or more favorites, and a list of one or more data attributes. The GUI also includes a workspace window that includes a first workspace window that shows the data attribute that a user is currently working on and a second workspace window that shows previously selected data attributes. The GUI may include a staging window where data attributes are dragged and dropped to create and update one or more graphical representations that provide substantially real-time feedback as to a number of records from the data source that include the dragged and dropped data attributes.

Implementations may include one or more of the following features. For example, the staging window may include one or more action areas that are presented to the user when the data attributes are dragged near the graphical representation. The action area may represent a Boolean operation to be performed on the records from the data source. The Boolean operations associated with the action area may include a refine operation, a split operation, and/or a complement operation.

The first workspace window may include a graphic representing the data attribute the user is currently working on and related data attributes that indicate a relative size of the number of records from the data source having the data attribute in relation to the number of records from the data source having the related data attributes.

These general and specific aspects may be implemented using a system, a method, or a computer program, or any combination of systems, methods, and computer programs.

Other features and advantages will be apparent from the description and drawings, and from the claims.

DESCRIPTION OF DRAWINGS

Like reference symbols in the various drawings indicate like elements.

DETAILED DESCRIPTION

Figure 1:
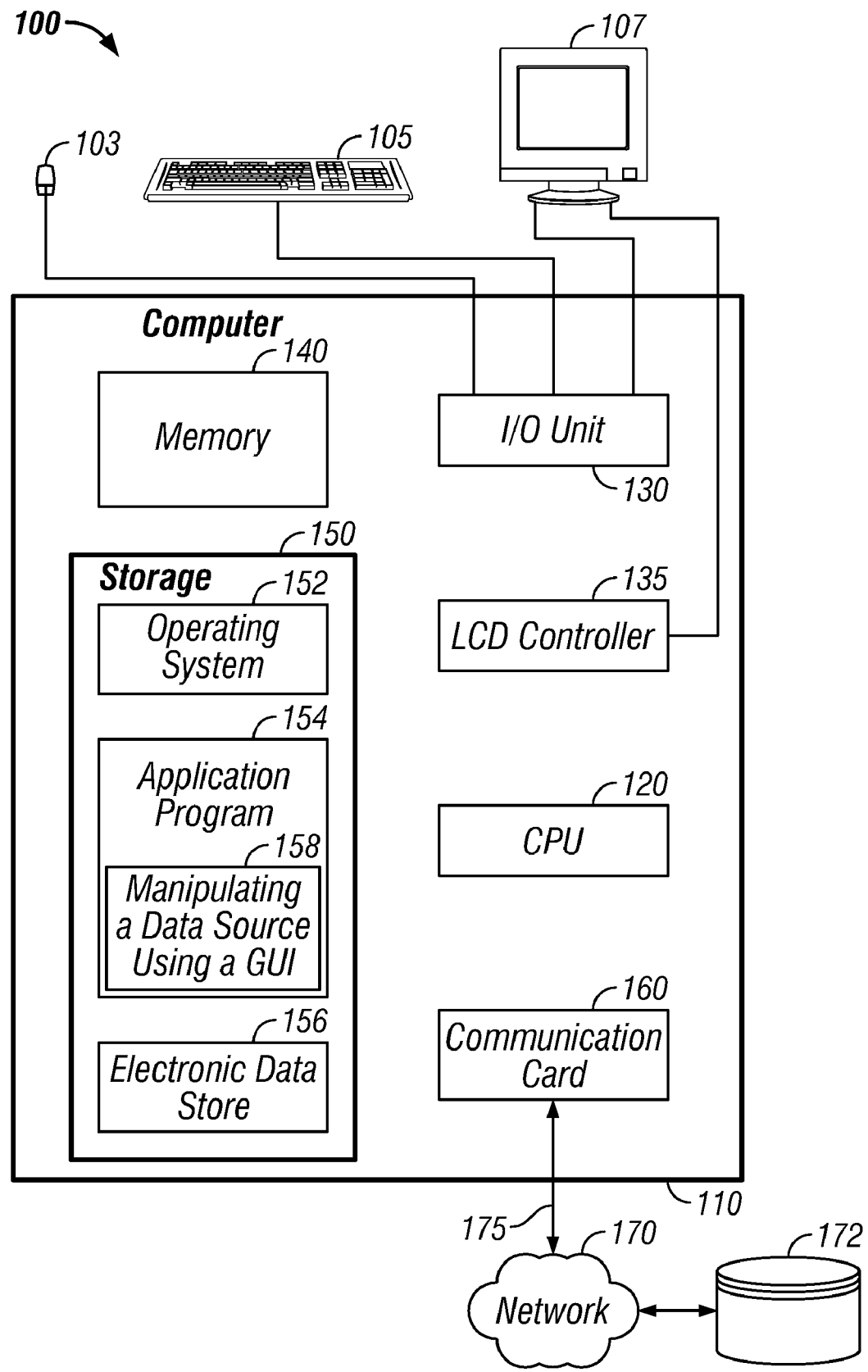
FIG. 1 is a block diagram of an exemplary computer system.

FIG. 1 illustrates an exemplary computer system 100. The system 100 may include various input/output (I/O) devices (e.g., mouse 103, keyboard 105, and display 107) and a general purpose computer 110 having a central processor unit (CPU) 120, an I/O unit 130, memory 140, and storage 150.

Storage 150 may store machine-executable instructions, data, and various programs, such as an operating system 152 and one or more application programs 154, all of which may be processed by CPU 120. Storage 150 also includes an electronic data store 156 that may be used to store and maintain a data source.

System 100 also may include a communications card or device 160 (e.g., a modem and/or a network adapter) for exchanging data with a network 170 using a communications link 175 (e.g., a telephone line, a wireless network link, a wired network link, or a cable network). Other examples of system 100 may include a handheld device, a workstation, a server, a device, a component, other equipment, or some combination of these capable of responding to and executing instructions in a defined manner.

An exemplary application program 154 may include an application program for manipulating a data source using a Graphical User Interface (GUI) 158. Application program 158 may be used as a stand-alone application program that accesses and manages a data source maintained in electronic data store 156. Additionally or alternatively, application program 158 may be used in concert with other similar computer systems 100 that include application program 158 connected through network 170 to access a data source maintained by an electronic data store 172 connected to the network 170. For instance, the application program 158 operating on computer system 100 may access and perform operations on a data source that is stored in and maintained by the electronic data store 172.

If the data source being manipulated is large, then data manipulations may take a long time to execute. In one implementation, application program 158 may perform data manipulations on a sample of the data source that is stored in and maintained by electronic data store 172. By performing the data manipulations on a representative sample of the data source, the time to execute the manipulations is reduced and an approximate result may be received quicker than if the manipulations had been performed on the entire data source. For example, a marketing professional may need a quick break down of the number of records in a customer database that are male customers and female customers from a database having millions of records. Performing the data manipulations on the entire database to get an exact answer may take too long when a quick approximate answer is preferred. Thus, the data manipulations may be performed on a representative sample of the database to obtain an approximate result.

Figure 2:
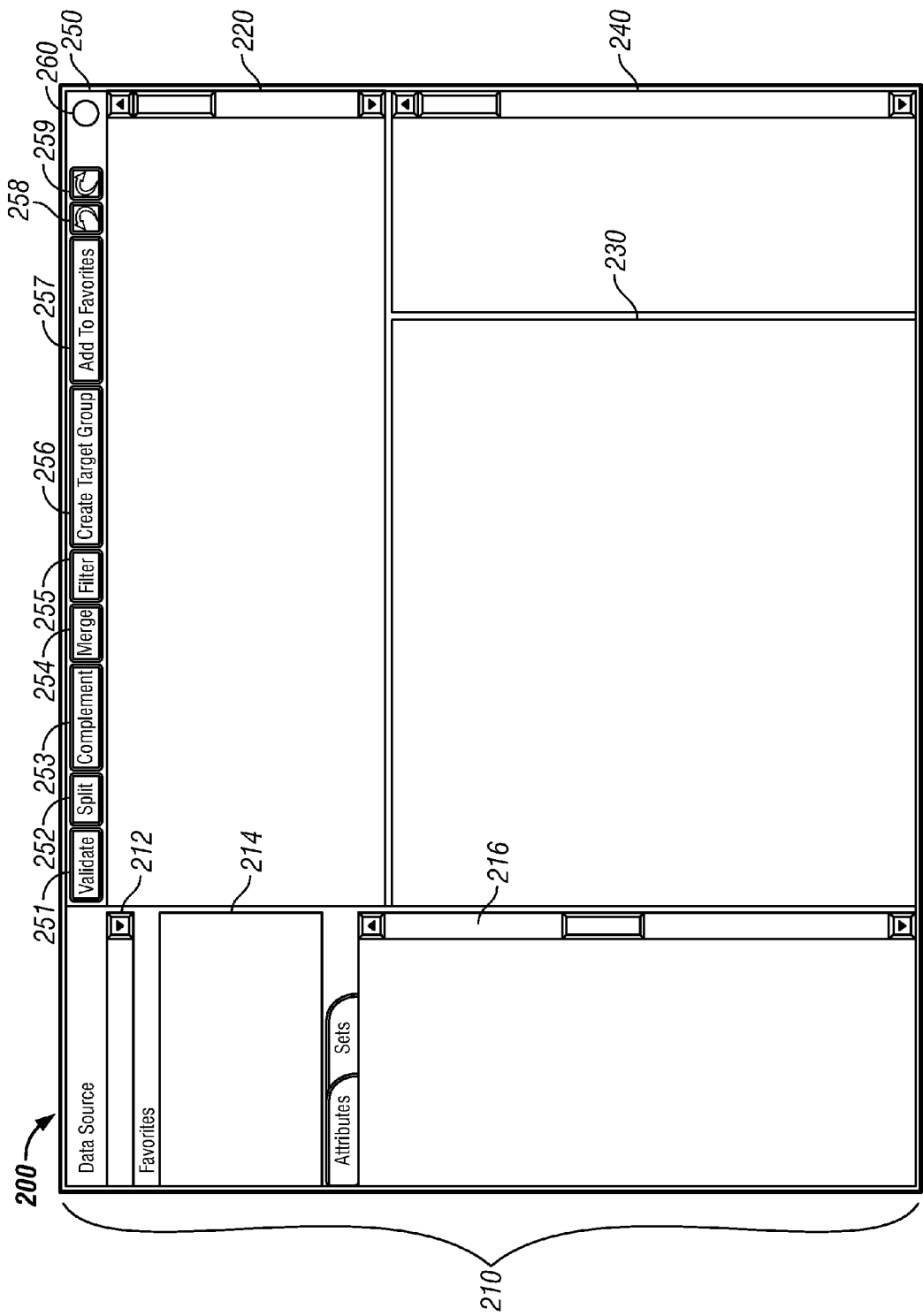
FIG. 2 is a block diagram of an exemplary Graphical User Interface (GUI).

FIG. 2 illustrates an exemplary Graphical User Interface (GUI) 200 to manipulate a data source. GUI 200 may be included as part of the application program 158 (FIG. 1) for manipulating a data source. In one implementation, GUI 200 may be used to access and manipulate the data source by performing as a segmentation tool to enable users to segment the data source in numerous ways using graphical representations to represent aspects of the data source. In one exemplary context, GUI 200 may be used in a marketing context to enable marketing professionals to segment a customer database to meet marketing needs, such as, for example, to segment a customer database to identify a target customer list for a marketing campaign. GUI 200 is not meant to be limited to a marketing context and may be used in other contexts.

GUI 200 typically includes one or more windows, such as, for example, a components window 210, a staging window 220, a workspace window 230, and a text description window 240. The windows 210, 220, 230, and 240 may be arranged and sized by the user and may include features such as, for example, scroll bars (e.g., auto-generated scroll bars), tabs, and drop-down menu selectors. Each of the windows 210, 220, 230, and 240 may be displayed individually or in combination with one or more of the other windows 210, 220, 230, and 240.

Components window 210 may display one or more component aspects of a data source. Components window 210 may further include one or more windows such as a data source window 212, a favorites window 214, and a data attributes window 216. The windows 212, 214, and 216 may be arranged and sized by the user and may include features such as, for example, scroll bars (e.g., auto-generated scroll bars), tabs, and drop-down menu selectors. Each of the windows 212, 214, and 216 may be displayed individually or in combination with one or more of the other windows 212, 214, and 216.

Data source window 212 enables a user to select a data source for access and use of the data source. The data source may be selected using the data source window 212 in different ways including, for example, using a drop-down menu that lists available data sources, using a mouse to click in the data source window 212 to display a listing of available data sources, or manually typing the name of the data source in the data source window 212. Once a data source has been selected, the name of the data source typically is displayed in the data source window 212.

The data source may be stored locally in an electronic data store on the user's machine (e.g., electronic data store 156 of FIG. 1), remotely in an electronic data store on a network (e.g., electronic data store 172 of FIG. 1), or in some combination of local and remote electronic data stores. In one exemplary implementation, the data source is stored in a remote electronic data store so that multiple users may access and use the same data source simultaneously.

The data source may include any type of data that is maintained in an electronic data store. For instance, the data source may include types of data that are used routinely by businesses and individuals. In one exemplary implementation, the data source may include customer related data that is stored and maintained by many businesses to use in a variety of ways, such as reporting, marketing, planning, and advertising.

The data source may be arranged in any number of formats that are typical for storage and arrangement in an electronic data store. In one example format, the data source may have one or more records with each record being defined by one or more fields or categories.

The favorites window 214 and the data attributes window 216 enable a user to graphically represent different aspects of the selected data source. In general, the data attributes window 216 includes one or more graphical representations of data attributes, which represent valid entries for one or more fields or categories from the data source. The data attributes may be graphically represented such as, for example, by an icon, a textual description, or a combination of an icon and a textual description. The data attributes may be organized and arranged in the data attributes window 216 in a number of different formats. In one exemplary implementation, the data attributes may be organized by the fields or categories from the data source with each data attribute arranged in a collapsible hierarchy beneath its appropriate field or category. The list of data attributes may be displayed and accessed by using a tab in the data attributes window 216.

The data attributes window 216 also may include one or more graphical representations of data attribute sets. The data attribute sets may be displayed and accessed by using a tab in the data attributes window 216. Data attribute sets may include one or more graphical representations of particular groupings of records from a data source that are identified by one or more data attributes. In an exemplary marketing context, the data attribute sets may graphically represent profiles or target groups of customers that are identified by one or more data attributes. A data set may be graphically represented such as, for example, by an icon, a textual description, or a combination of an icon and a textual description. The user may specify and change the textual description for a data set.

In an exemplary marketing context, a profile may include one or more attributes used as the criteria to generate a target group. A target group may include a specific list of names generated by a profile, which may, for example, be used as the contact list in a marketing campaign.

The favorites window 214 includes graphical representations of records from the data source that have been manipulated and designated as favorites either by default designation or by user designation. The favorites window 214 enables a user who has manipulated the data source using the GUI 200 to save a particular data manipulation as a graphical representation in the favorites window 214 for later reuse without having to perform the steps of that particular manipulation again. The graphical representation displayed in the favorites window 214 may represent one or more data attributes or one or more data sets, which may be a particular grouping of one or more records from the data source having one or more data attributes. The particular grouping of records from the data source may represent a default grouping of records or may represent a previous manipulation of the data source by the user. In one implementation, the favorites window 214 enables the user to store a manipulation of the data source to be used again in a later data source manipulation. The favorites may be graphically represented such as, for example, by an icon, a textual description, or a combination of an icon and a textual description. The user may specify and change the textual description for a favorite.

Staging window 220 represents an area of GUI 200 that may be used to perform actions on the data source based on inputs received from the user and to display graphical representations of records from the data source. In one implementation, graphical representations may be dragged from the components window 210 (e.g., the favorites window 214 or the data attributes window 216) or from the workspace window 230 and dropped in the staging window 220. For example, when the graphical representations from the components window 210 or the workspace window 230 are dropped in the staging window 220, a graphical representation may be created that represents records from the data source related to the particular component. As additional graphical representations from the components window 210 or the workspace window 230 are dropped in the staging window 220, the graphical representation that represents records from the data source is updated.

As graphical representations from other windows (e.g., components window 210 and workspace window 230) are dragged near a graphical representation in the staging window 220, one or more action areas are presented to the user. In one implementation, the action areas may be located near the graphical representation in the staging window 220. The action areas typically include a graphical representation of an operation to manipulate the data source. The actions to manipulate the data source may include Boolean type operations (e.g., AND, OR, NOT, AND NOT) or other types of operations. The Boolean type operations may be represented by a graphical representation and/or a textual description that may be familiar to the user.

The action area may include a geometric-shaped (e.g., circular, square, triangular, rectangular) menu window centered on the graphical representation of the records which opens up when a data attribute is dragged near the graphical representation. The geometric-shaped menu window may be divided into one or more slices with each slice serving as an action area.

When a graphical representation from one window is dragged near a graphical representation in the staging window 220, action areas are presented to the user who may pick one of the action areas by dropping the dragged graphical representation into the picked action area. As the graphical representation is dragged over an action area, an indication may be presented to the user to indicate that an action area is picked. For example, as the graphical representation is dragged over an action area, the action area may provide an indication by changing colors, changing shading, and/or appearing as raised above the other action areas.

More than one graphical representation may be displayed in the staging area 230 where each graphical representation may represent records from the data source. Operations to manipulate the data source may be performed on the graphical representations either individually or collectively. A more detailed description of the types of actions that may be performed is described below with reference to FIGS. 4-27.

The graphical representations in the staging window 220 may include an icon, a textual description, or a combination of an icon with a textual description. The textual description may be entered by default. For example, when the user drags and drops a data attribute into the staging window 220, the description may describe the particular data attribute.

Inputs received from the user may include, for example, drag and drop operations, drag-pick-and-drop operations, click and point operations, drop down menu operations, right mouse click and select operations, and combinations of these operations.

Workspace window 230 illustrates an area of GUI 200 that may be used to graphically display one or more components as they are selected from other windows, such as the components window 210 or the staging window 220. The workspace window 230 provides a graphic visual indication to the user, with or without accompanying text, of the item that has been selected. The display may include textual description that accompanies the graphical representation. Components may be selected from the components window 210 by an input received from the user, such as, by clicking on one or more data attribute categories, specific data attributes, or favorites.

More specifically, the workspace window 230 may provide a graphic display of the results of selecting one or more graphical representations from the components window 210 and the staging window 220. For example, if a graphical representation is selected from the staging window 220 and a data attribute is selected from the components window 210, the resulting graphical display illustrates the effect that the selected data attribute will have on the selected graphical representation. In this manner, the user is provided substantially real-time feedback as to the effect selecting a data attribute from the components window 210 will have on a selected graphical representation from the staging window 220. Additionally, graphical representations displayed in the workspace window 230 may be dragged and dropped into the staging window 220 to create a new graphical representation or to update an existing graphical representation in the staging window 220.

The graphic displays in the workspace window 230 may include icons, graphs, charts, maps, pictures, objects, other graphical representations, and combinations of these types of displays. The graphic displays in the workspace window 230 may be changed by the user from one type of graphic display to another type of graphic display. For instance, if a bar graph is initially displayed in the workspace window 230, the user may change the display to a pie chart.

Text description window 240 represents an area of GUI 200 that may be used to provide a textual description of what is being graphically represented in one of the other windows (e.g., components window 210, staging window 220, and workspace window 230).

GUI 200 also includes a toolbar 250. Toolbar 250 may include tabs and push-button actions, such as, for example, a validate action 251, a split action 252, a complement action 253, a merge action 254, a filter action 255, a "Create Target Group" action 256, and an "Add To Favorites" action 257. Toolbar 250 also may include an undo action 258, a redo action 259, and an alert indicator 260. The toolbar actions are described in more detail below.

Figure 3:
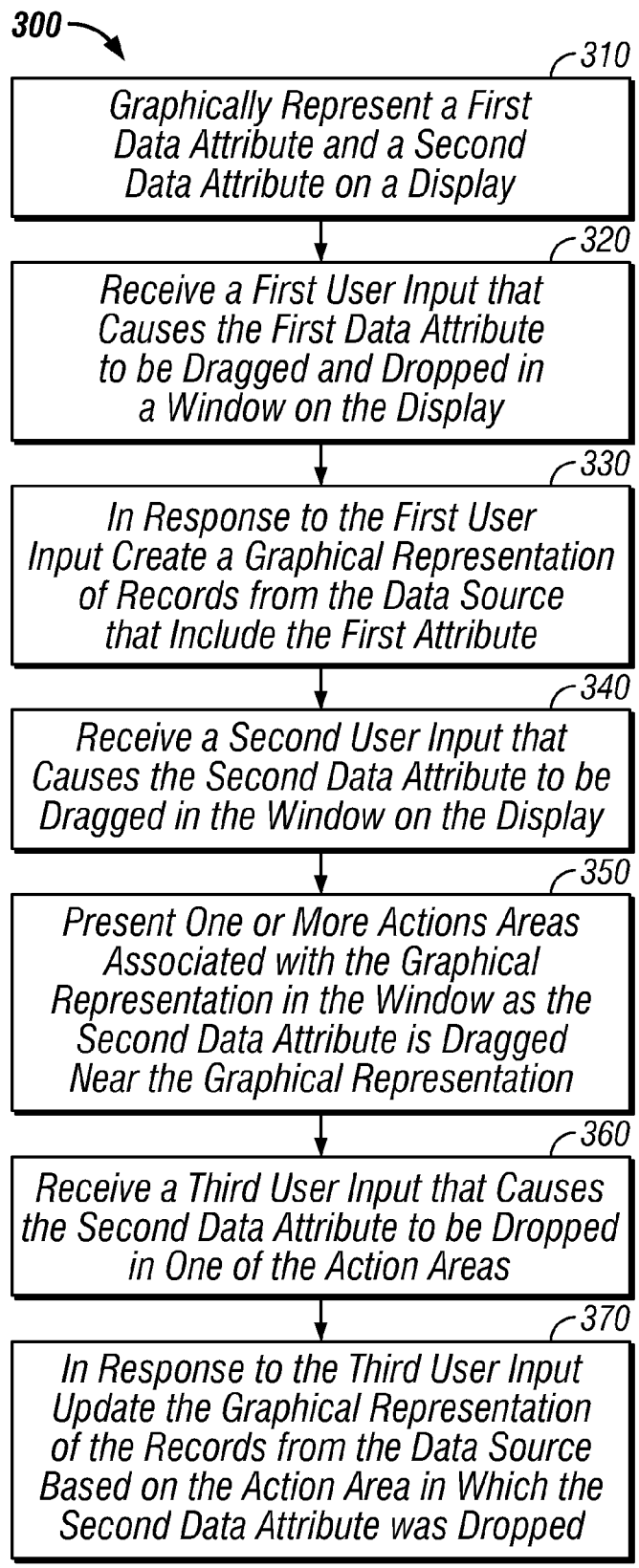
FIG. 3 is a flow chart illustrating a process for manipulating a data source.

FIG. 3 illustrates a flow chart of an exemplary process 300 for manipulating a data source. Manipulating a data source may include graphically representing a first data attribute and a second data attribute on a display (step 310). Each of the data attributes may represent valid entries for one or more fields from a data source that has one or more records. A user input may be received that causes the first data attribute to be dragged and dropped from one window of the display to another window of the display (step 320). When the first data attribute is dropped in the window, a graphical representation may be created (step 330). The graphical representation represents records from the data source that include the first attribute. In one implementation, the graphical representation may illustrate a number of record from the data source that include the first attribute.

A second user input may be received that causes the second data attribute to be dragged in the window where the graphical representation was created (step 340). When the second data attribute is dragged near the graphical representation, one or more action areas may be presented (step 350). Each action area represents an operation that may be performed on the second data attribute and the graphical representation to update the graphical representation as to the records represented from the data source. The action area may include a geometric-shaped (e.g., circular, square, triangular, rectangular) menu window centered on the graphical representation of the records which opens up when a data attribute is dragged near the graphical representation. The geometric-shaped menu window may be divided into one or more slices with each slice serving as an action area. When the second data attribute is dropped (step 360), the graphical representation that represents records from the data source is updated (step 370).

The operations that may be performed include Boolean operations. The Boolean operations may be graphically presented to a user using visual cues and text that may be more familiar to the user than Boolean operations. For example, the type of operations presented to the user may include a split operation, a complement operation, a merge operation, and a filter operation, where these operations may represent different types of Boolean operations. The operation performed depends on the action area in which the second data attribute is dropped. When the second data attribute is dropped in an action area, the operation represented by the action area is performed. Other data attributes may be dragged and dropped in the window and other operations may be performed as the other data attributes are dropped in the window.

In one implementation, when a data attribute is dragged and dropped in the window containing the graphical representation and an operation is performed, the graphical representation may be updated to provide real-time or substantially real-time feedback as to the number of records from the data source represented by the updated graphical representation.

Process 300 is described in more detail below with respect to one exemplary illustration depicted in FIGS. 4-27. FIGS. 4-27 illustrate process 300 in the context of segmenting a data source for a marketing campaign. In this example, process 300 is used to segment a data source to identify a target group of "Record Club" members for marketing purposes. The exemplary illustration is provided as an example and is not meant to limit the types of data and data sources that may be manipulated using the GUI and the process. Nor is it meant to limit the context to segmenting a data source for marketing purposes.

Figure 4:
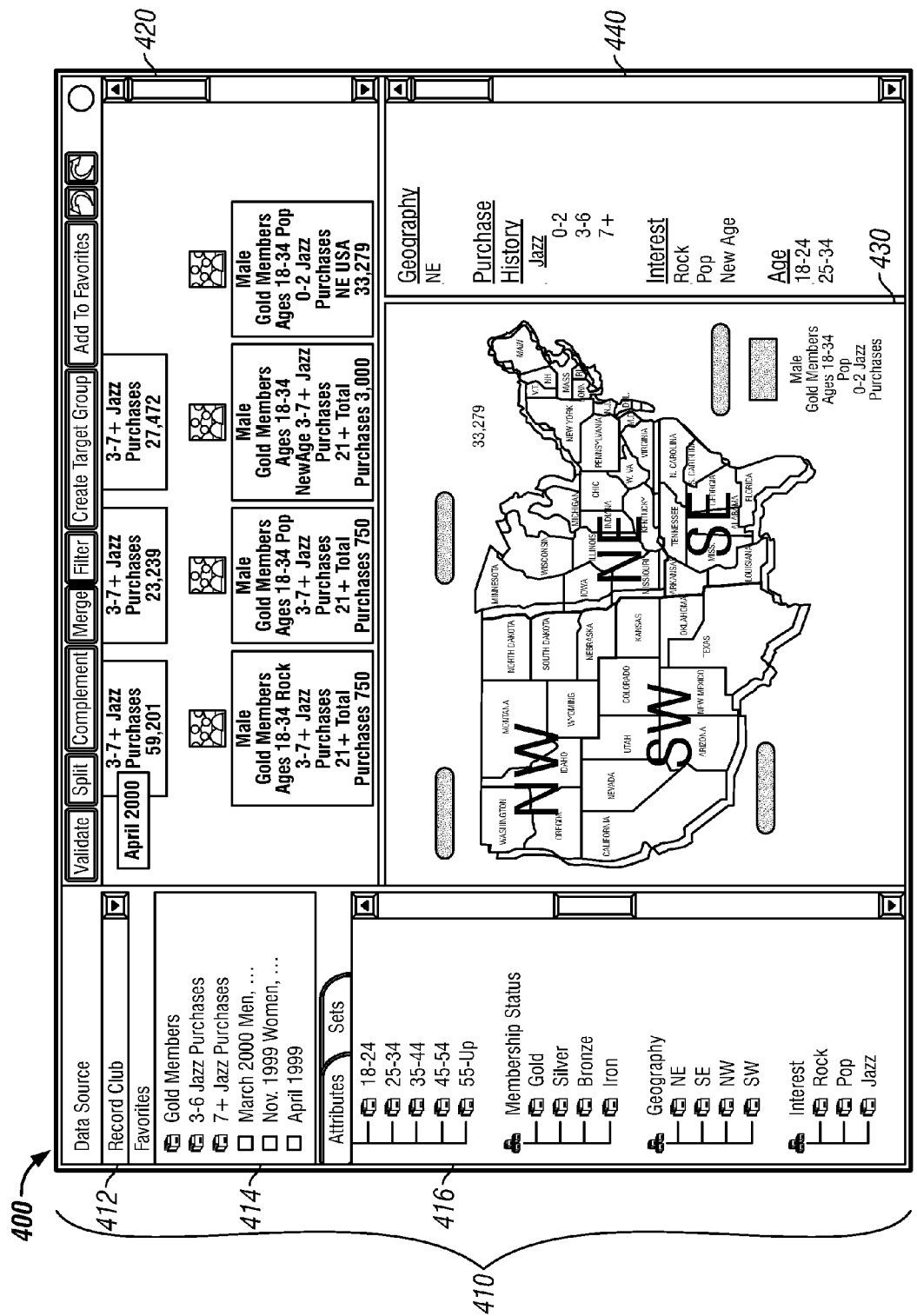
FIGS. 4-27 are block diagrams of an overview of an exemplary illustration of the GUI.

FIG. 4 illustrates an overview of an exemplary implementation of GUI 400. GUI 400 includes components window 410, staging window 420, workspace window 430, and text description window 440. In this exemplary illustration, components window 410 further includes data source window 412, favorites window 414, and data attributes window 416. As indicated in data source window 412, the data source in this example relates to a record club. For example, GUI 400 may be used to manipulate a data source for data records related to the record club data source. In this example, GUI 400 may be used as a segmentation tool to create a target group for a marketing campaign from the selected data source. From the identified target group, a specific list of names may be generated as a contact list for a marketing campaign. GUI 400 is used to manipulate the record club data source 412 to create the target group from the data source.

Figure 5:
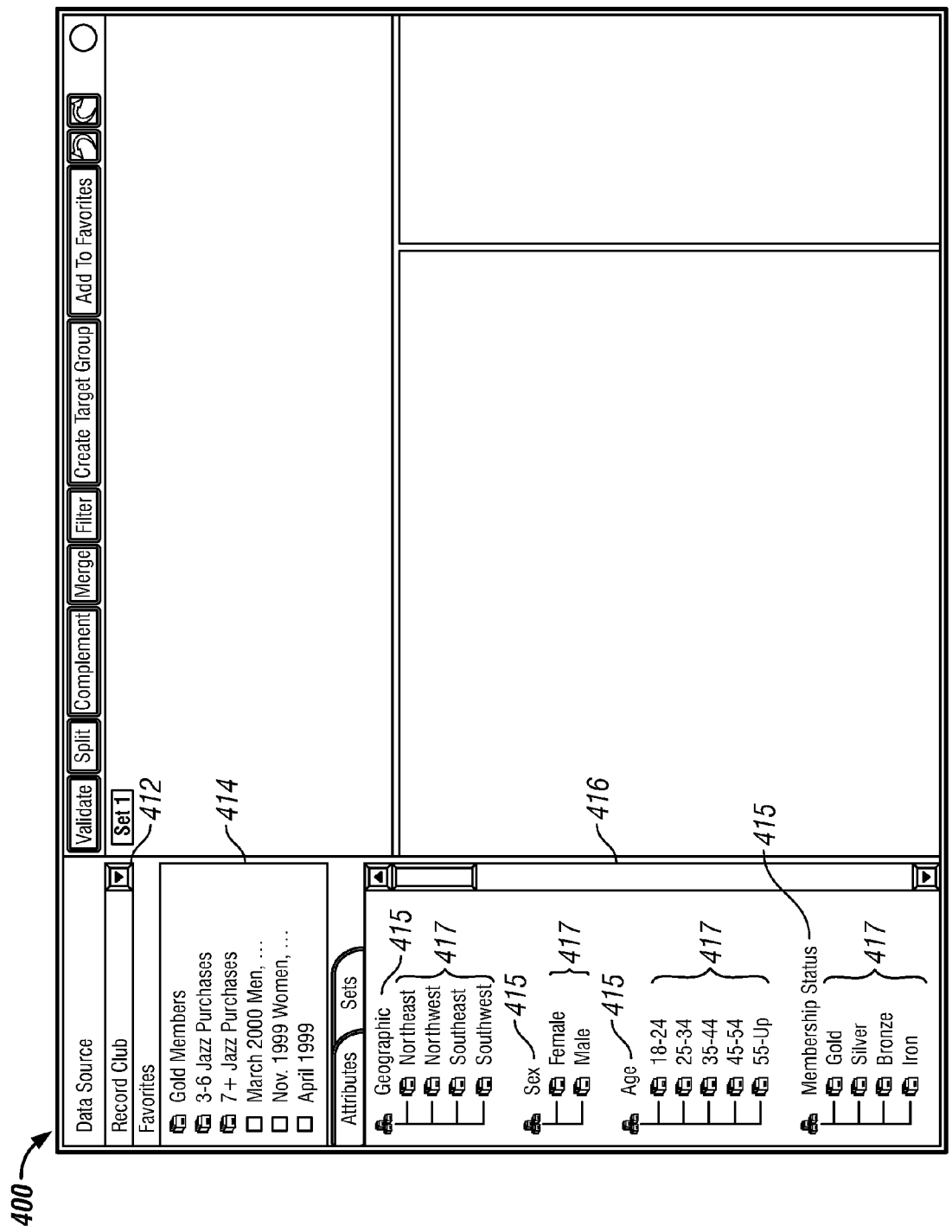

FIG. 5 illustrates an example of the GUI 400 that is presented to the user when a data source is initially selected using the data source window 412. When the data source is selected, the favorites window 414 and the data attributes window 416 are populated. The favorites window 414 includes graphic representations of records from the Record Club data source having specific attributes. The favorites graphics representation may have been created automatically by default using predefined data attributes or may have been segmented previously by a user and saved as a favorite in the favorites window 414.

The data attributes window 416 includes graphic representations of data attribute categories 415 and data attributes 417. The data attribute categories 415 graphically represent fields from the data source (e.g., geographic, sex, age, and membership status). The data attributes 417 graphically represent valid entries for the fields from the data source (step 310 of FIG. 3).

Figure 6:
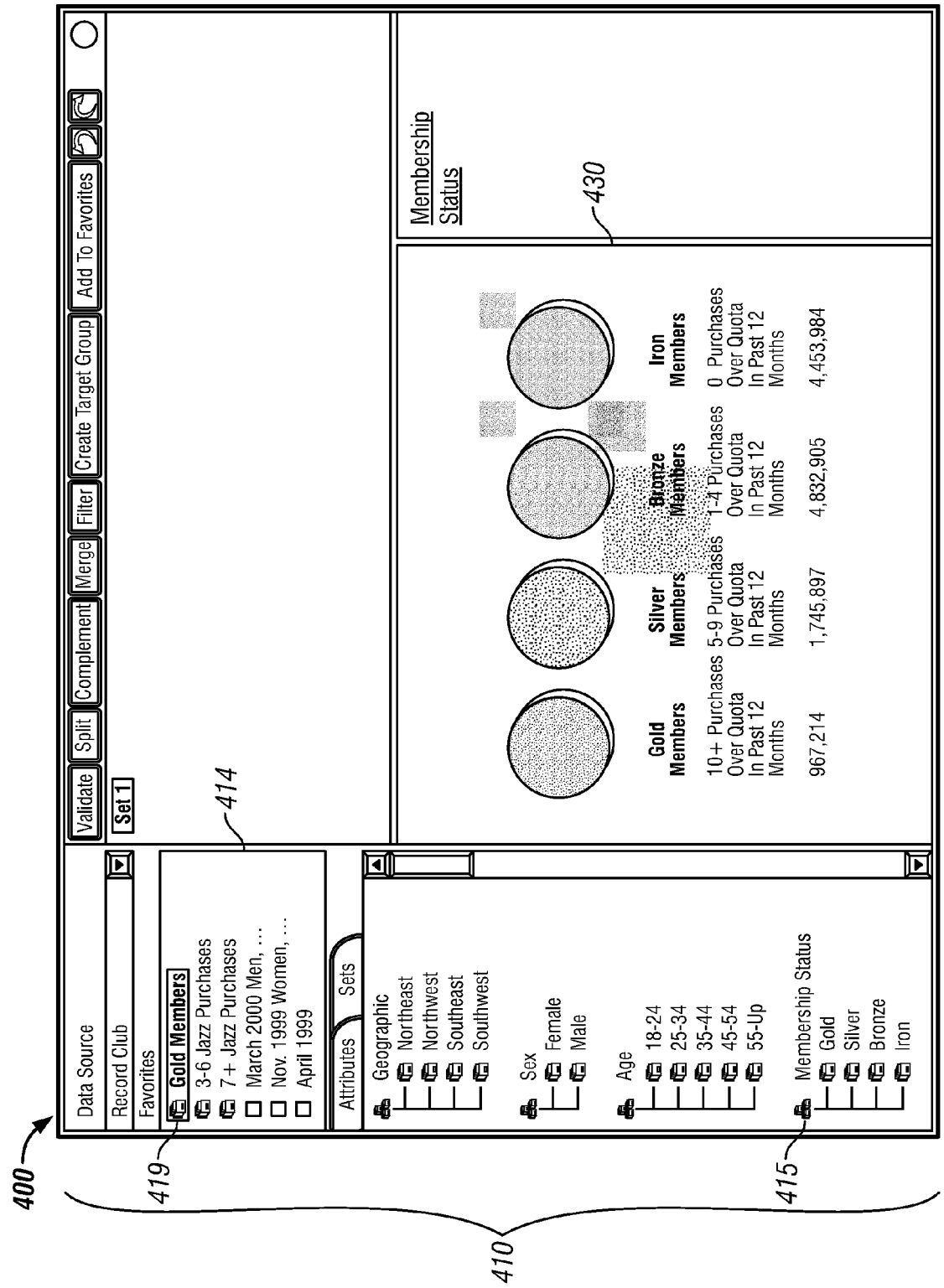

FIG. 6 illustrates an example of the GUI 400 that is presented to the user when the user makes a selection from the component window 410. In this instance, when the user selects "Gold Members" 419 in the favorites window 414 (e.g., by using a mouse to click on "Gold Members" 419) the "Gold members" favorite is highlighted. As a result of the selection, the workspace window 430 displays graphical representations of Gold members and related favorites (i.e., Silver members, Bronze members, and Iron members). In this case, the graphical representations in the workspace window 430 include different colored icons with textual descriptions that define the particular data attributes. The graphical representations in the workspace window 430 indicate to the user a number of records from the data source that have these particular data attributes. For instance, the data source includes: 967,214 records of members who have made 10+ purchases over quota in the past twelve months; 1,745,897 records of members who have made 5-9 purchases over quota in the past twelve months; 4,832,905 records of members who have made 1-4 purchases over quota in the past twelve months; and 4,453,984 records of members who have made 0 purchases over quota in the past twelve months.

Figure 7:
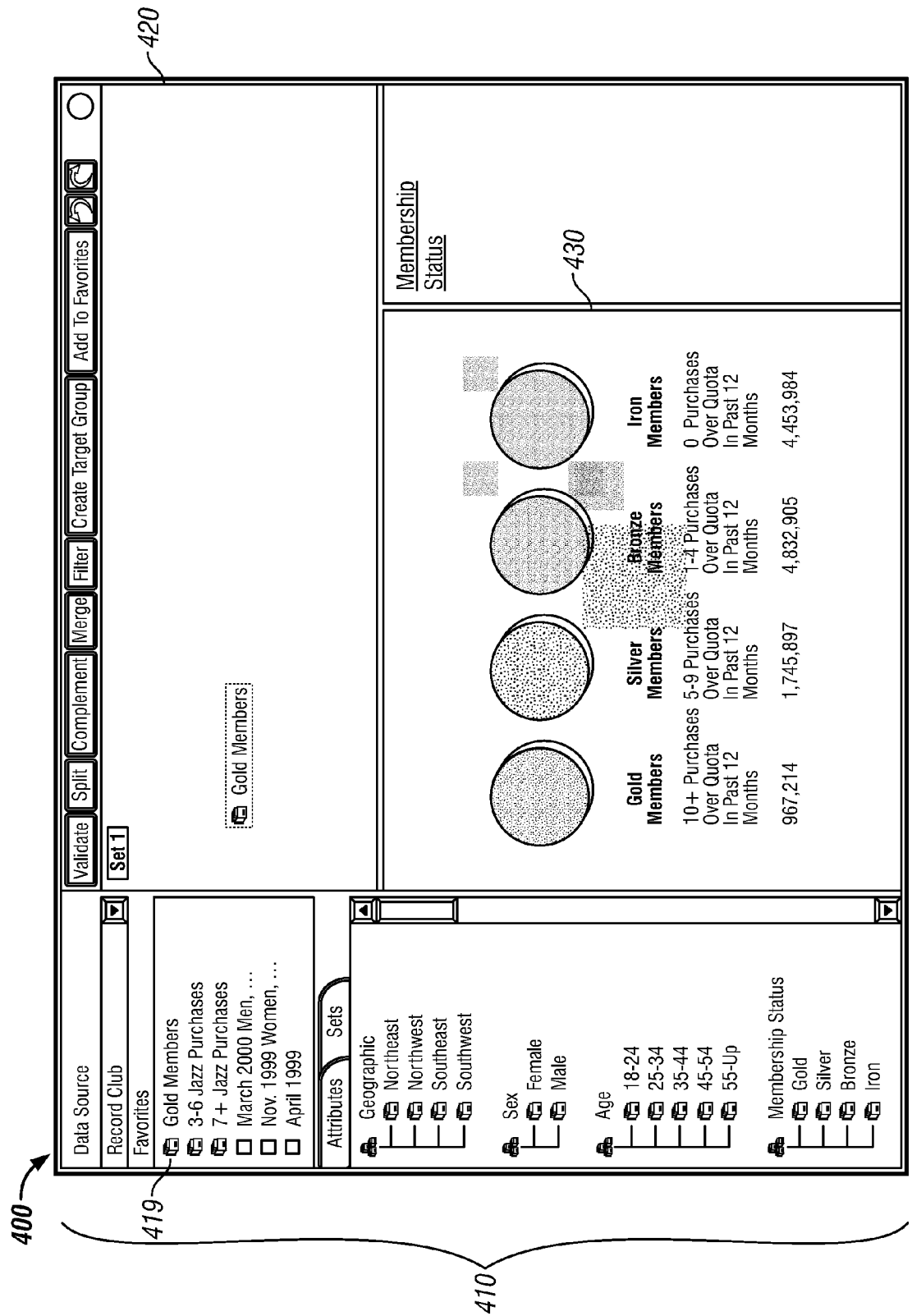

FIG. 7 illustrates an example GUI 400 that is presented to the user when the user drags a graphical representation from the component window 410 to the staging window 420. In this example, the "Gold members" favorite is dragged from the components window 410 to the staging window 420 (step 320 of FIG. 3).

Figure 8:
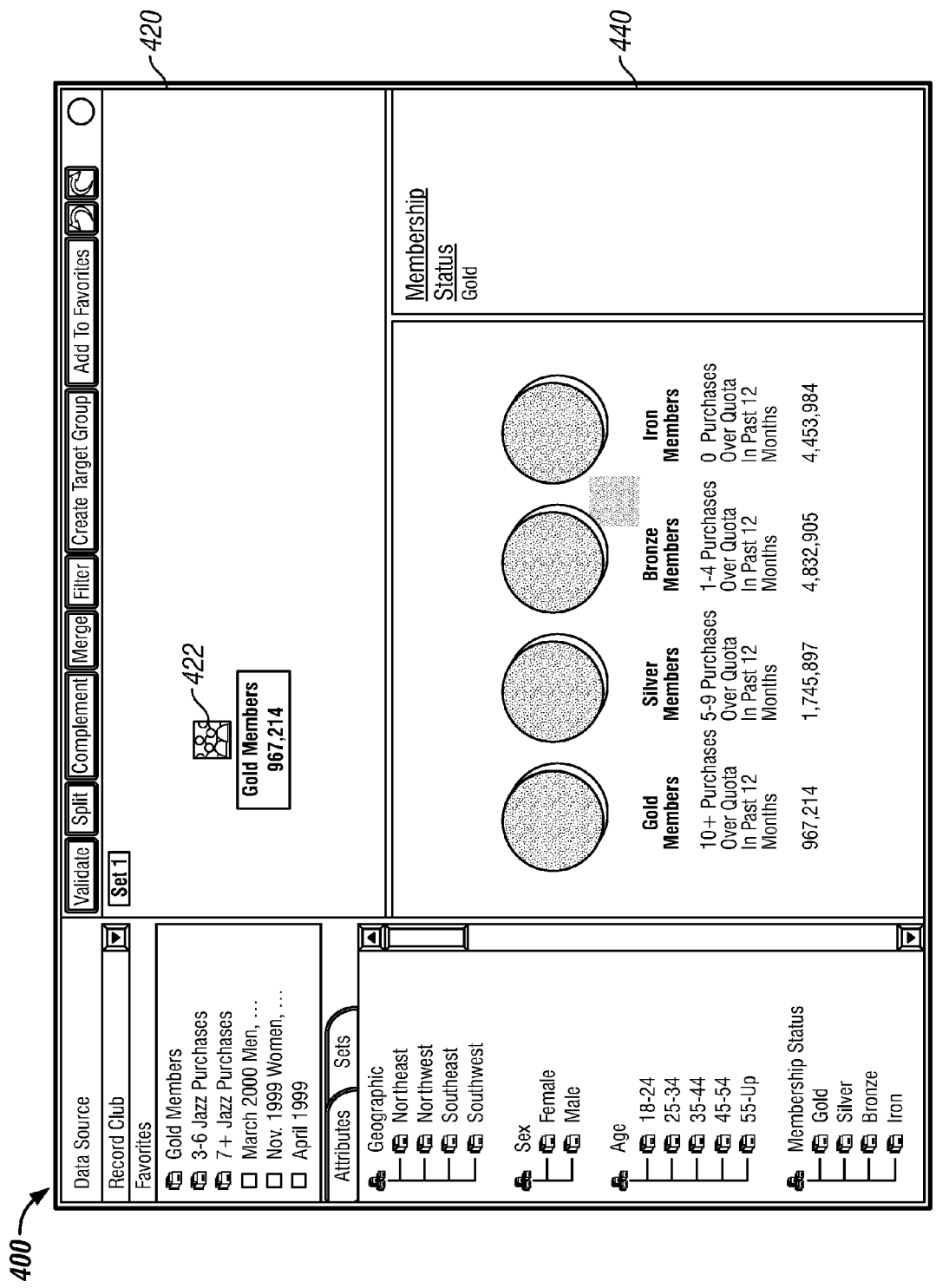

FIG. 8 illustrates an example GUI 400 that is presented to the user when the user drops a graphical representation in the staging window 420. In this example, the "Gold members" favorite is dropped in the staging window 420 (step 320 of FIG. 3). When the "Gold members" favorite is dropped in the staging window 420, a graphical representation 422 of records from the data source that include data attributes defined by being a Gold member is provided (step 330 of FIG. 3). The graphical representation 422 in this example includes an icon with a text description of the name of the graphical representation and the number of records from the data source represented by the icon. When the favorite is dropped in the staging window 420, the user receives substantially real-time feedback as to the number of records from the data source represented by the graphical representation. Additionally, the text description window 440 provides a textual description of the data attribute of the graphical representation 422.

Figure 9:
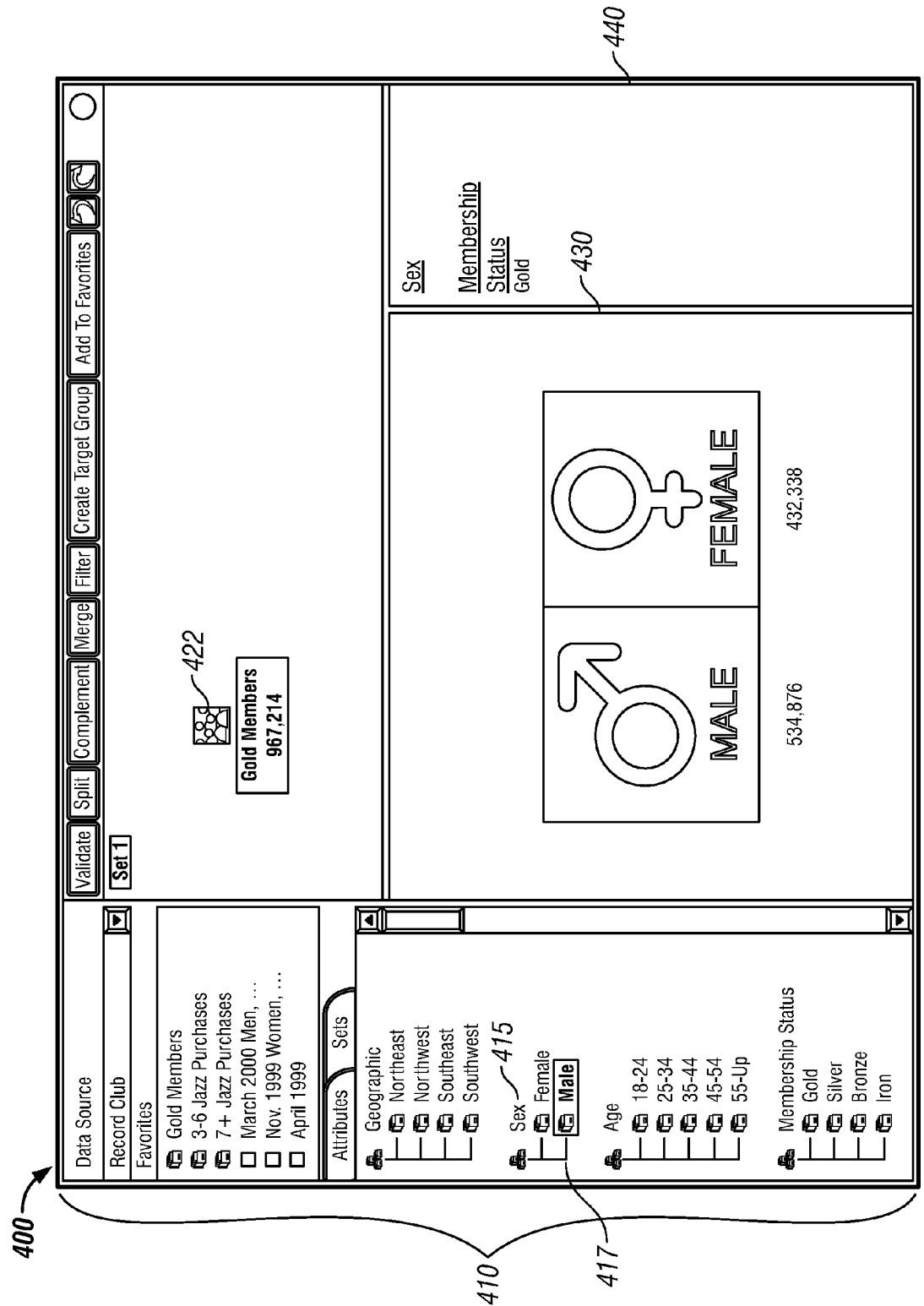

FIG. 9 illustrates an example of GUI 400 that is presented to the user when the user selects a data attribute 417 in the component window 410. In this example, the user selects the data attribute 417 "Male" from the component window 410. When the data attribute 417 is selected, the workspace window 430 displays a graphic of the data attribute category 415 including one or more of the data attributes from the category (e.g., male and female). The workspace window 430 provides substantially real-time feedback as to a number of records in the data source that include particular data attributes 417 as the data attributes relate to the selected graphical representation 422. The text description window 440 is updated to indicate the data attribute category that has been selected.

In this example, the scaling of the graphic in the workspace window 430 provides a visual indication to the user as to the relative size of the number of records represented by the data attributes. In this case, there are more males than females, so the size of the male block is larger than the female block.

Figure 10:
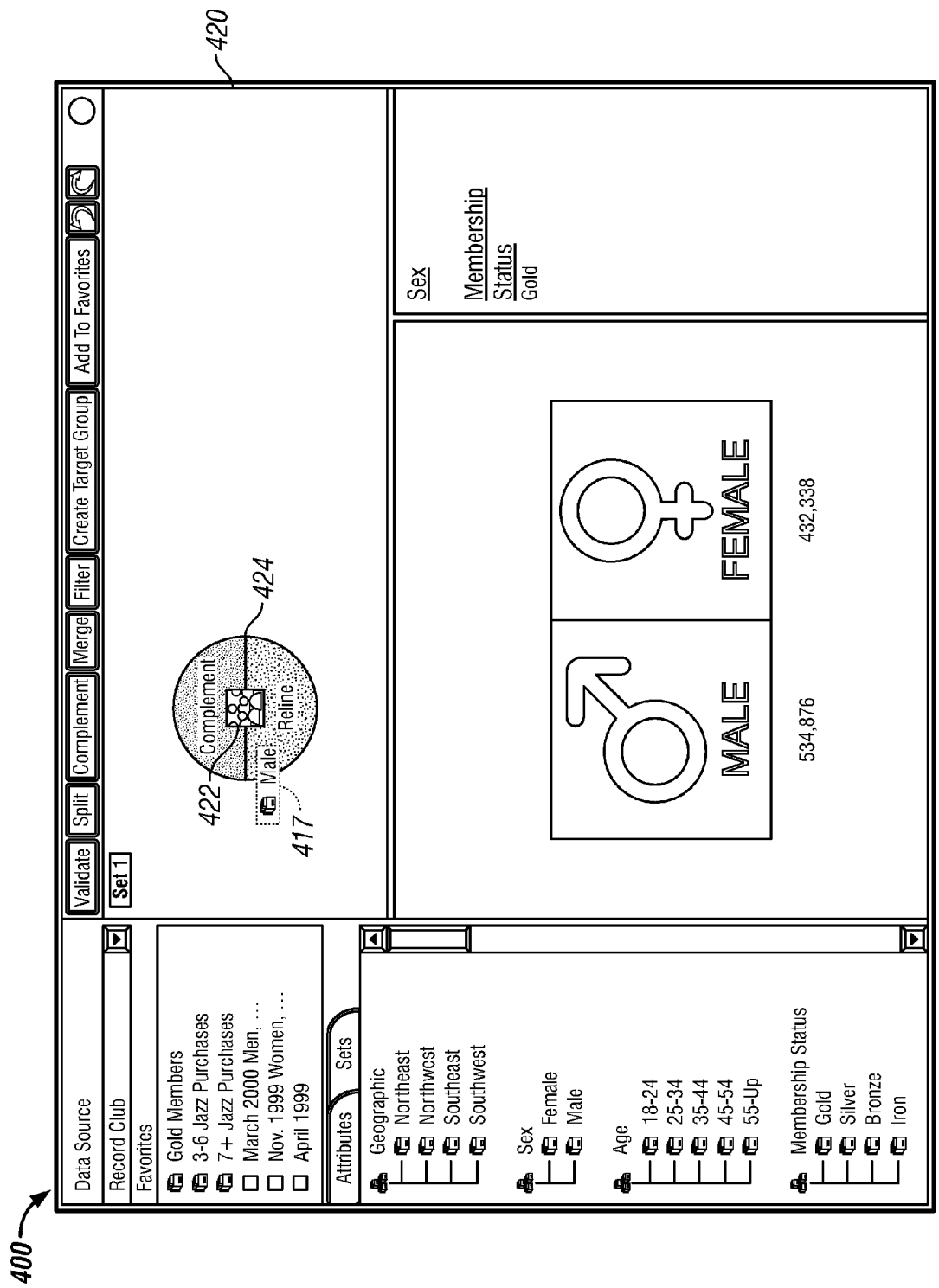

FIG. 10 illustrates an example of GUI 400 that is presented to the user when the user drags a data attribute 417 near a graphical representation 422 in the staging window 420 (steps 340 and 350 of FIG. 3). As the selected data attribute 417 is dragged near the graphical representation 422 in the staging window 420, two action areas 424 are presented to the user (step 350 of FIG. 3). The action areas 424 that are presented to the user may depend on a number of different variables, such as, for example, the number of objects being dragged, the type of objects being dragged, the type of graphical representation in the staging window 420, or combinations of these variables. The action areas 424 presented may be the most likely action areas that a user would need taking the variables into account.

In this example, the action areas 424 presented to the user are a "complement" action area and a "refine" action area. The refine action area operates like a Boolean AND operator. If data attribute 417 is dropped in the refine action area 424, then the graphical representation 422 will be updated to graphically represent the number of records from the data source that include both the Gold member data attribute and the Male data attribute. The complement action area operates like a Boolean AND NOT operator. If data attribute 417 is dropped in the complement action area 424, then the graphical representation 422 will be updated to graphically represent the number of records from the data source that include the Gold member data attribute and not the Male data attribute.

In this example, the user dragged the data attribute 417 from the component window 410. Alternatively, the user could have selected the data attribute from the workspace window 430 and dragged the data attribute from the workspace window 430 to the staging window 420.

Depending on the type of graphical representation already present in the staging window 420, different action areas 424 may be presented to the user. For example, if the graphical representation in the staging window 420 represents a target group, then as other graphical representations are dragged near the target group, an "intersect" action area and a "remove" action area may be presented. The intersect action area may perform similarly to a refine action area and the remove action area may perform similarly to the complement action area. Other types of action areas also are possible.

Figure 11:
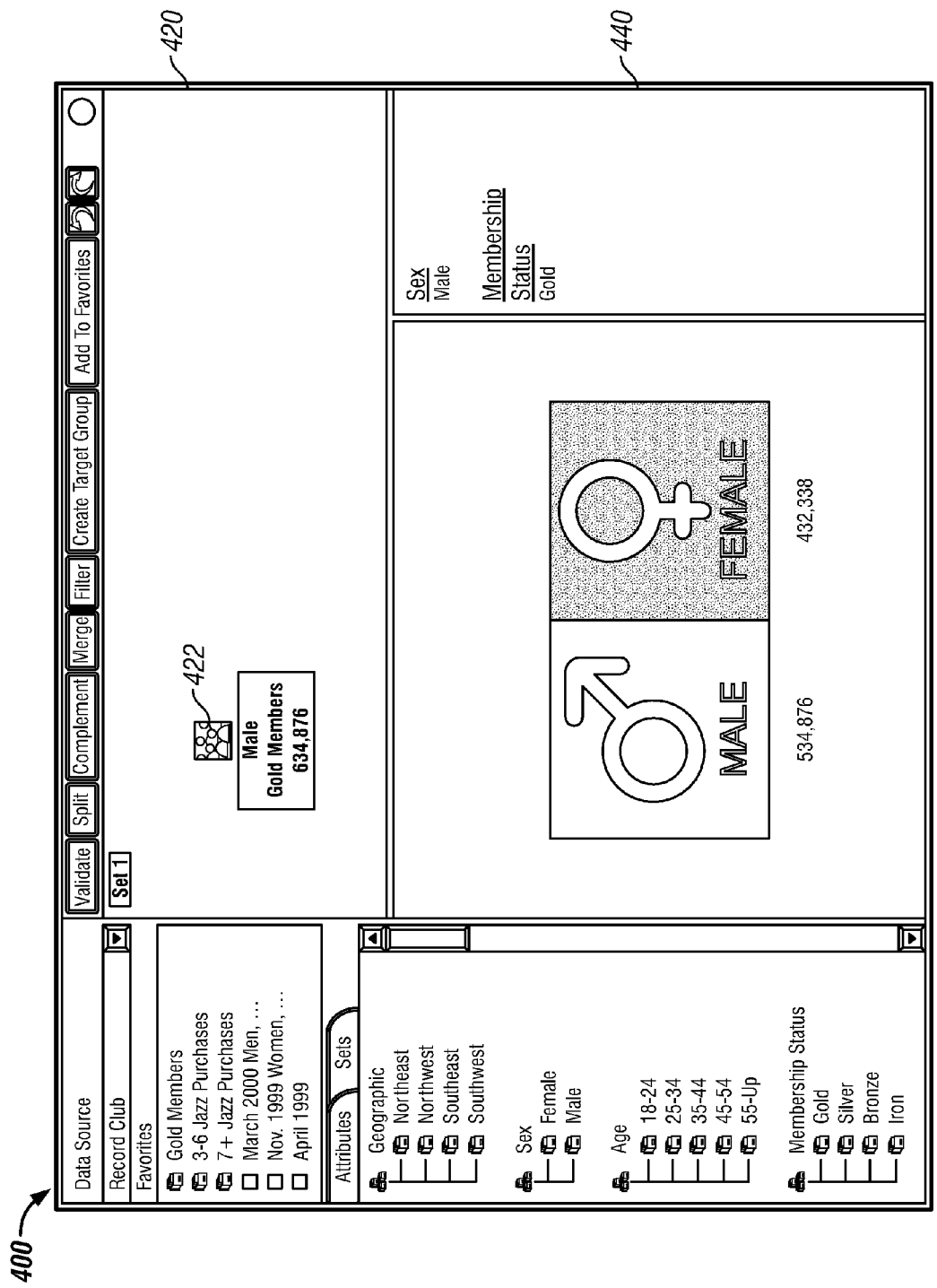

FIG. 11 illustrates an example of GUI 400 that is presented to the user after the user drops a data attribute in one of the action areas (steps 360 and 370 of FIG. 3). When the user drops the data attribute in the action area, the graphical representation 422 is updated based on the action area in which the data attribute was dropped (step 370 of FIG. 3). In this example, the user dropped the Male data attribute (417 of FIG. 10) in the refine action area (424 of FIG. 10). The graphical representation 422 is updated to reflect the number of records from the data source that include gold membership status and male. When the user drops the data attribute in the action area and the graphical representation is updated, the user is provided with substantially real-time feedback as to the number of records from the data source. The text description window 440 is updated to reflect the data attributes that define the graphical representation.

Figure 12:
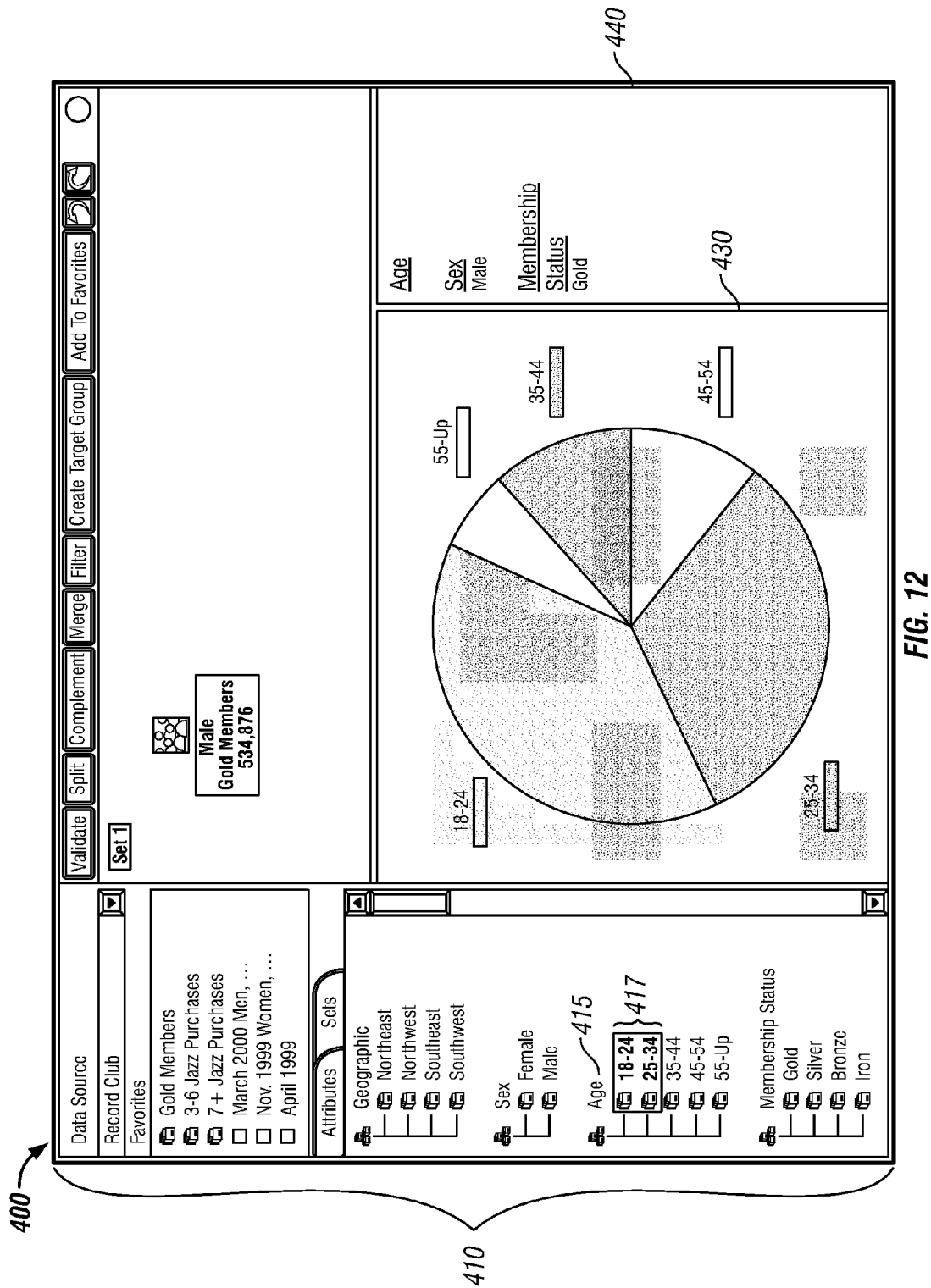

FIG. 12 illustrates an example of GUI 400 that is presented to the user when multiple data attributes 417 are selected. In this example, the user selects two data attributes 417 from the components window 410. When the data attributes 417 are selected, the workspace window 430 displays a graphical representation of the data attribute category 415 including one or more of the data attributes 417. In this example, the workspace window 430 displays a pie chart of the "Age" data attribute category including the different "Age" data attributes within the category. The pie chart illustrates a relative distribution of the number of records in the data source having the different age data attributes. As also shown, the text description window 440 is updated to show that data attributes 417 from the "Age" data attribute category 415 have been selected.

The user may change the type of graphical representation illustrated in the workspace window 430. For example, the user may change the graphical representation from a pie chart to a different type of graphical representation, such as, for example, a bar graph, a line graph, or other type of graphical representation.

Figure 13:
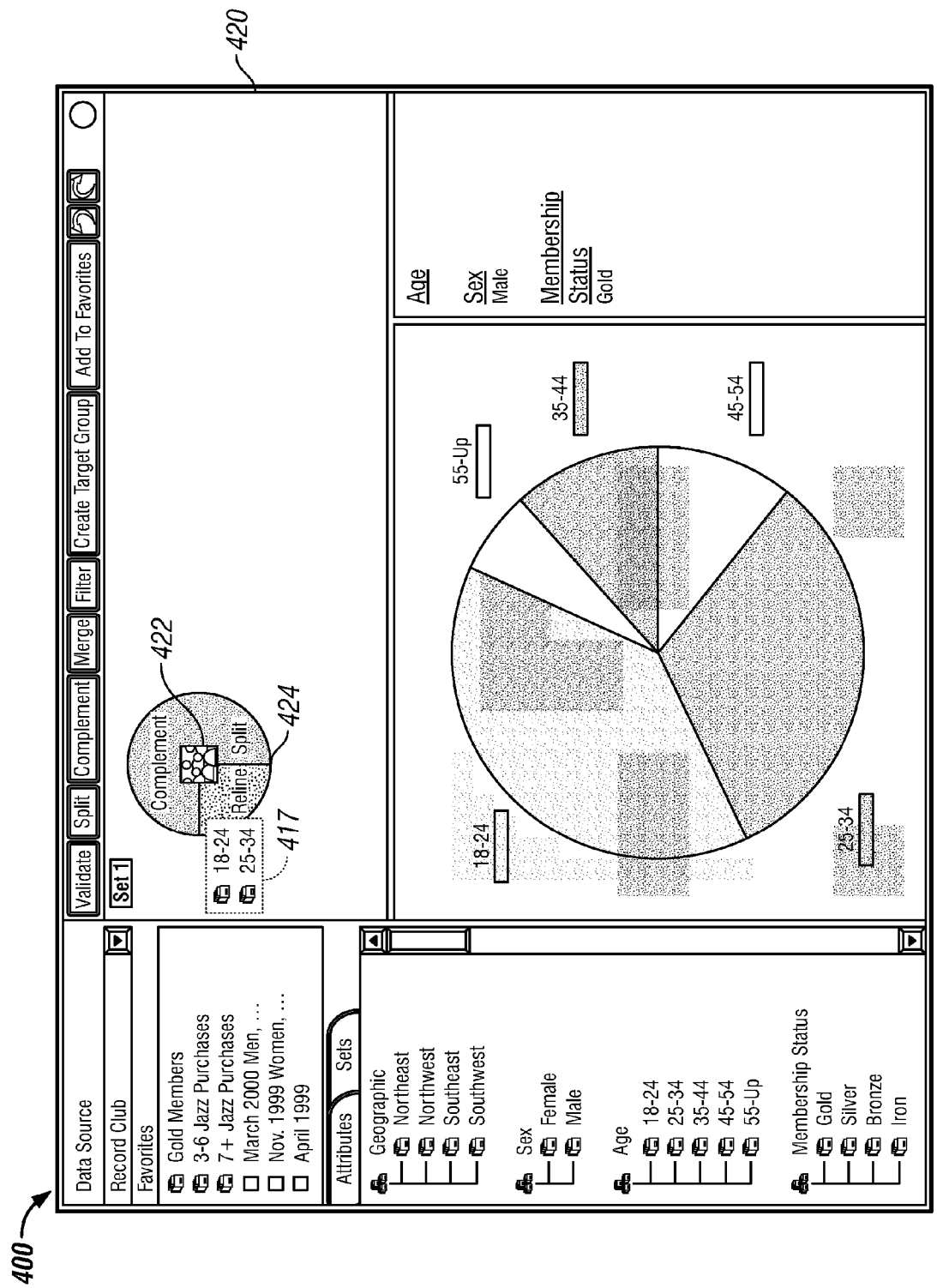

FIG. 13 illustrates an example of GUI 400 that is presented to the user when multiple data attributes 417 are dragged near a graphical representation 422 in the staging window 420 (350 of FIG. 3). As the selected data attributes 417 are dragged near the graphical representation in the staging window 420, three action areas 424 are presented to the user (350 of FIG. 3). As discussed above, the action areas 424 presented to the user may depend on a number of variables and the action areas 424 that the user is most likely to need are presented. In this example, the three action areas 424 presented to the user are the "refine" action area, the "complement" action area, and the "split" action area. The operation of the refine action area and the complement action area are discussed above with respect to FIG. 10. The split action area creates one or more new graphical representations in the staging window 420 based on the number of attributes 417 dropped in the action area 424.

Figure 14:
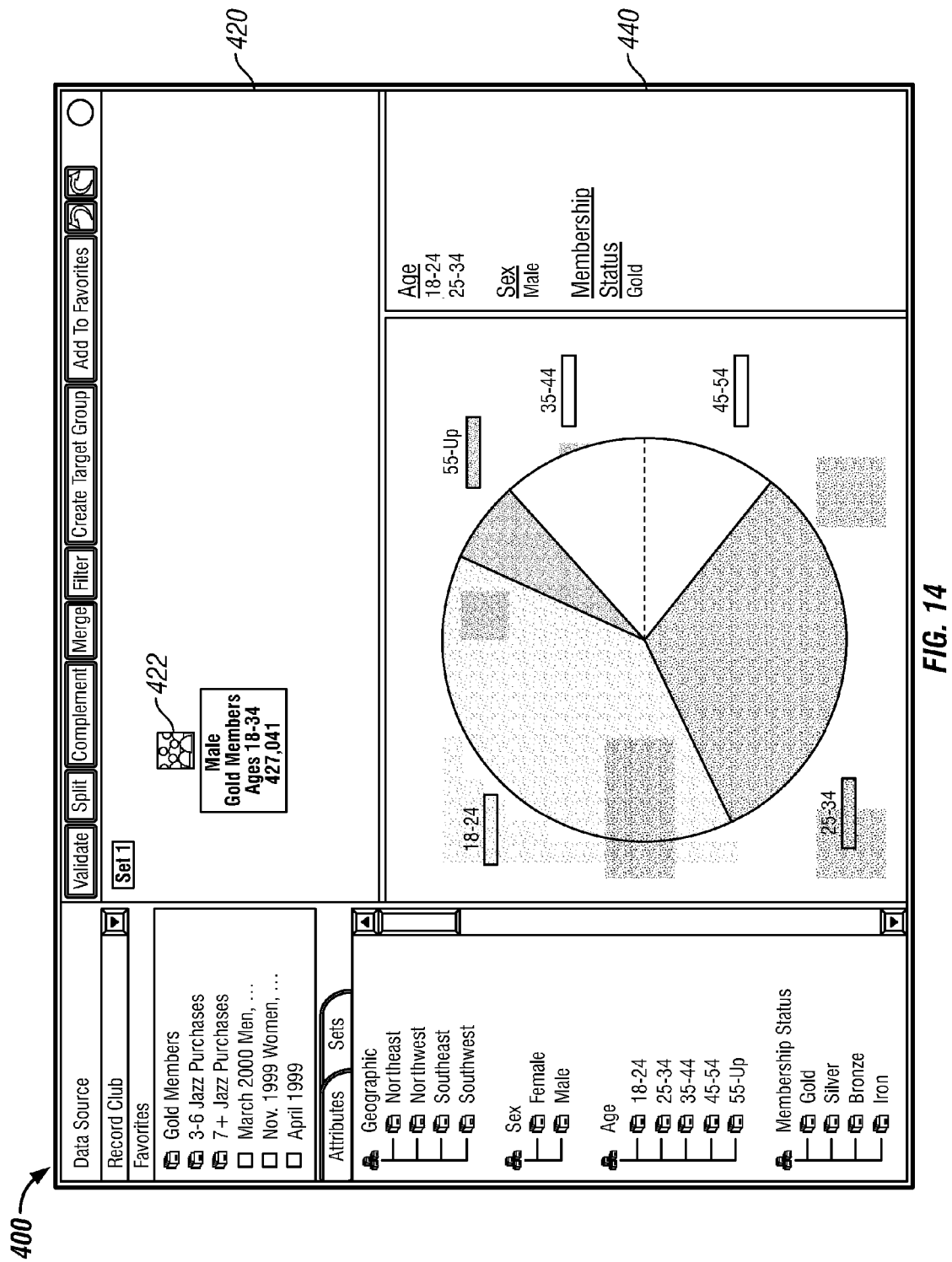

FIG. 14 illustrates an example of GUI 400 that is presented to the user when multiple data attributes are dropped in an action area near a graphical representation 422 in the staging window 420 (steps 360 and 370 of FIG. 3). When the user drops the data attributes in the action area, the graphical representation 422 is updated based on the action area in which the data attributes were dropped (step 370 of FIG. 3). In this example, the user dropped the 18-24 data attribute and the 25-34 data attribute (417 of FIG. 10) in the refine action area (424 of FIG. 10). The graphical representation 422 is updated to further refine the number of records from the data source that include the 18-24 data attribute and the 25-34 data attribute. When the user drops the data attributes in the action area and the graphical representation is updated, the user is provided with substantially real-time feedback as to the number of records from the data source. The text description window 440 is updated to reflect the data attributes that define the graphical representation. In this instance, the 18-24 and 25-34 data attributes are displayed in the text description window 440.

Figure 15:
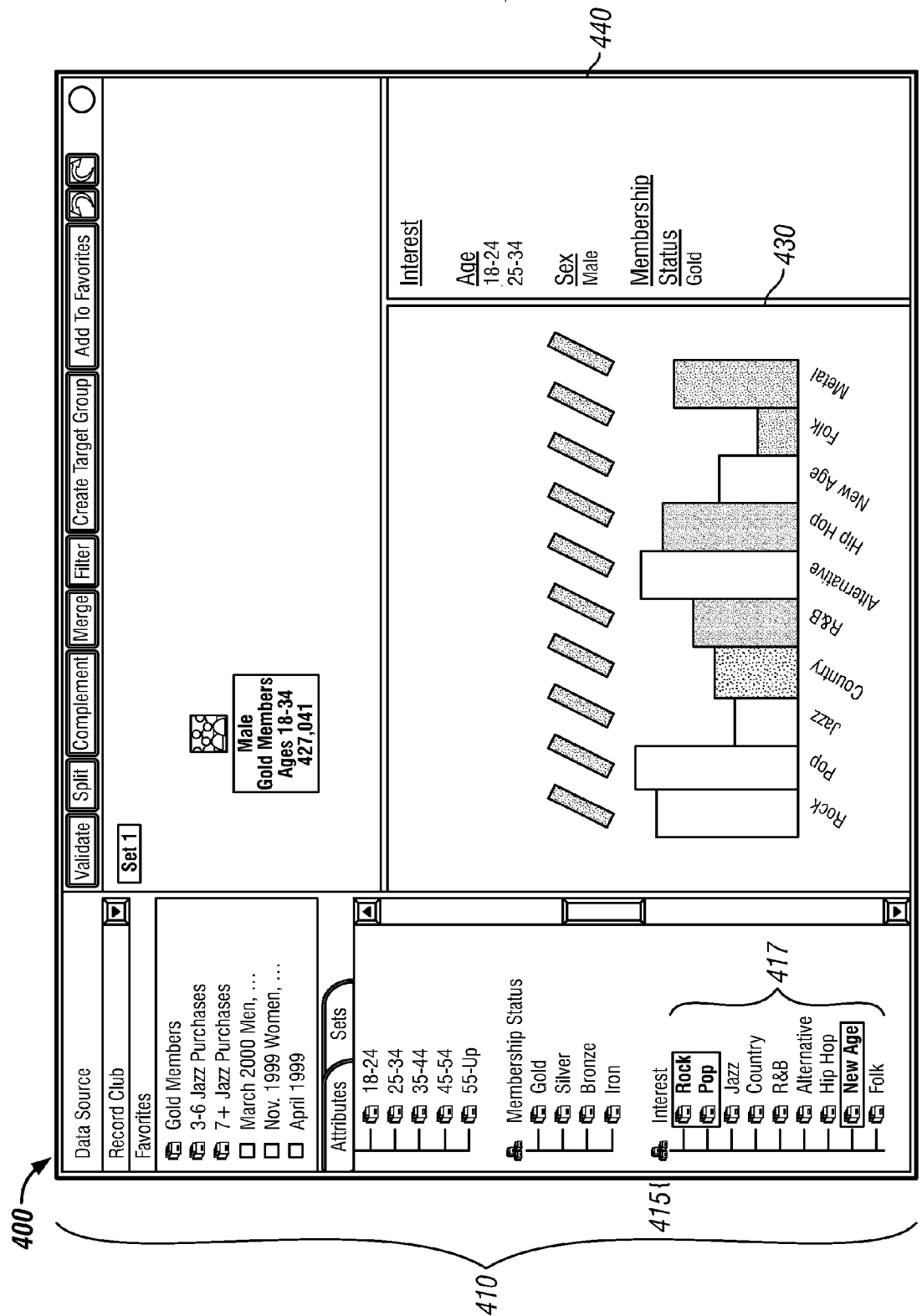
Figure 16:
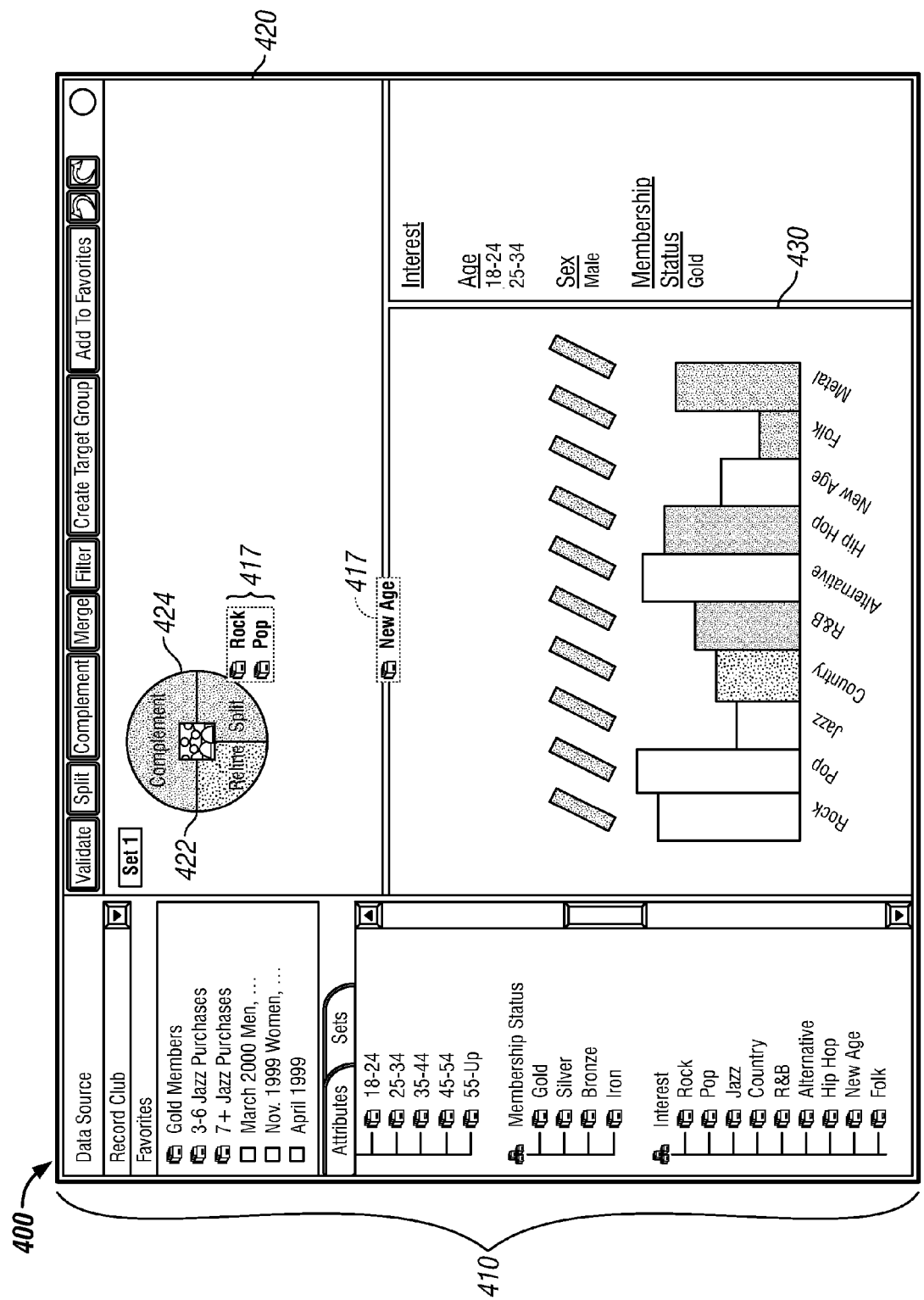
Figure 17:
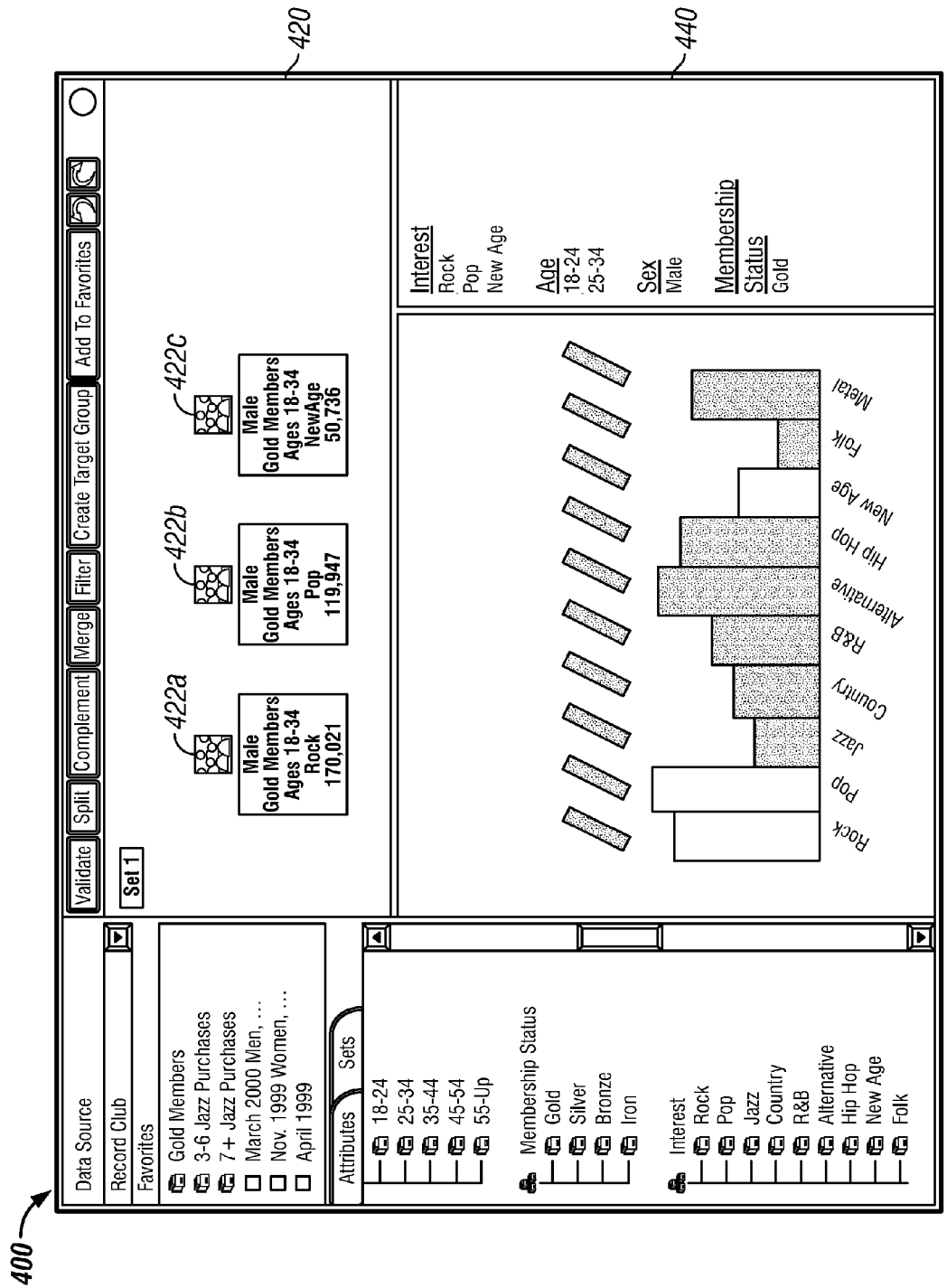

FIGS. 15-17 illustrate an example of GUI 400 that is presented to the user when multiple data attributes are selected (FIG. 15), dragged near the graphical representation (FIG. 16), and dropped in a split action area (FIG. 17). In FIG. 15, three data attributes 417 (rock, pop, and new age) are selected from the component window 410. When the data attributes 417 are selected, the workspace window 430 displays a graphical representation of the data attribute category 415 ("Interest") and the data attributes 417 from that category. In this example, the workspace window 430 displays a bar graph of the data attributes 417 that indicates the relative number of records from the data source that include a particular data attribute. As discussed above, the user may change the type of graphical representation display in the workspace window 430. Text description window 440 has been updated to reflect that the "Interest" data attribute category has been selected.

In FIG. 16, three data attributes are dragged near the graphical representation 422 in the staging window 420. The data attributes may be dragged from the component window 410 or the workspace window 430 to the staging window 420. As the data attributes are dragged near the graphical representation 422, multiple action areas 424 are presented to the user.

In FIG. 17, the three data attributes (417 of FIG. 16) have been dropped in the split action area. As a result, the graphical representation (422 of FIG. 16) is split into three new graphical representations 422a, 422b, and 422c, based on the number of data attributes that were dropped in the split action area. The graphical representations 422a, 422b, and 422c are now split according to the three interest data attributes (i.e., rock, pop, and new age). The graphical representations 422a, 422b, and 422c provide the user substantially real-time feedback as to the number of records in the data source that include the data attributes defined by the graphical representations 422a, 422b, and 422c.

Figure 18:
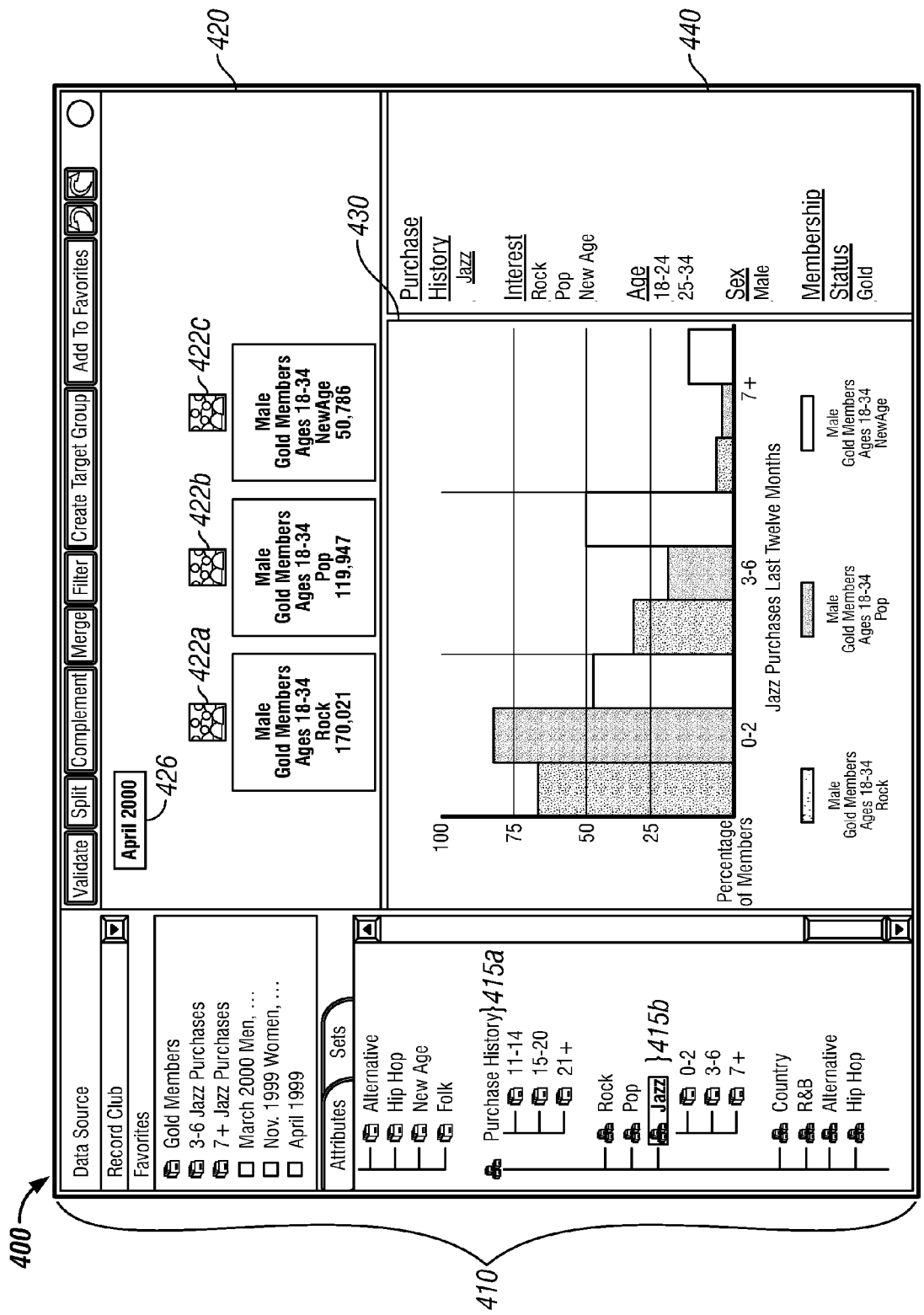

FIG. 18 illustrates an example GUI 400 that is presented to the user when multiple graphical representations 422a, 422b, and 422c are selected in the staging window 420 and a data attribute category 415a or sub-category 415b is selected in the components window 410. In this instance, the workspace window 430 displays a graphical representation that provides the user substantially real-time feedback as to how the graphical representations 422a, 422b, and 422c in the staging window 420 are affected by the selection of the data attribute sub-category 415b (i.e., jazz purchase history). In this example, the graphical representation in the workspace window 430 is a bar graph; however, as discussed above, other types of graphical representations may be presented and the user may change the type of graphical representation. The text description window 440 is updated to reflect that the jazz purchase history data attribute sub-category 415b has been selected. Additionally, the user may define a name 426 for the set of graphical representations 422a, 422b, and 422c in the staging window 420.

Figure 19:
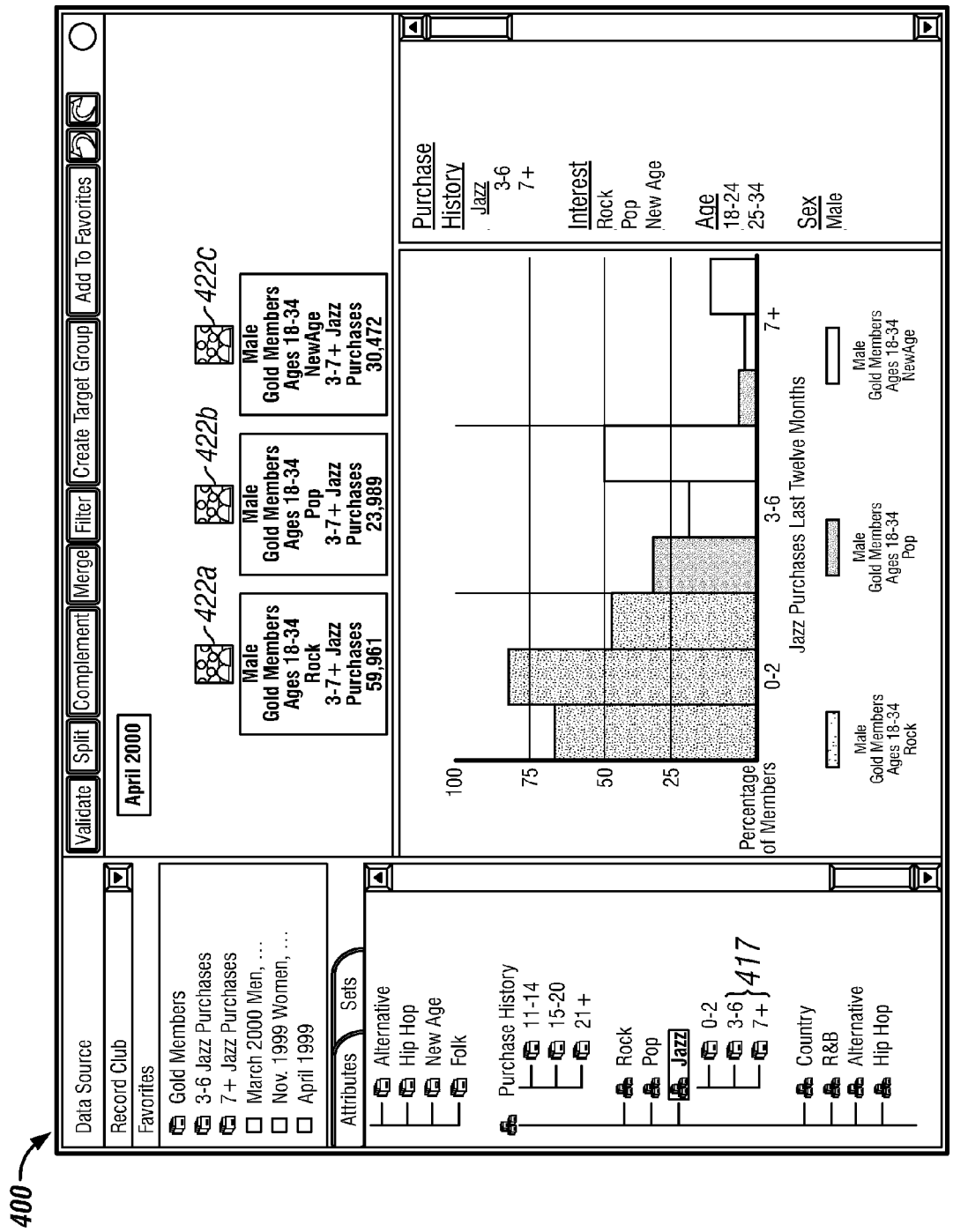

FIG. 19 illustrates an example of GUI 400 that is presented to the user when multiple graphical representations 422a, 422b, and 422c are further updated to take into account additional data attributes 417. In this example, the data attributes 417 (i.e., 3-6 jazz purchases and 7+ jazz purchases) are used to further refine the graphical representations 422a, 422b, and 422c. The graphical representations 422a, 422b, and 422c may be updated by selecting the data attributes 417 and dragging and dropping the data attributes 417 in a "Refine" action area that may be presented to the user when the data attributes are dragged near the graphical representations 422a, 422b, and 422c.

Figure 20:
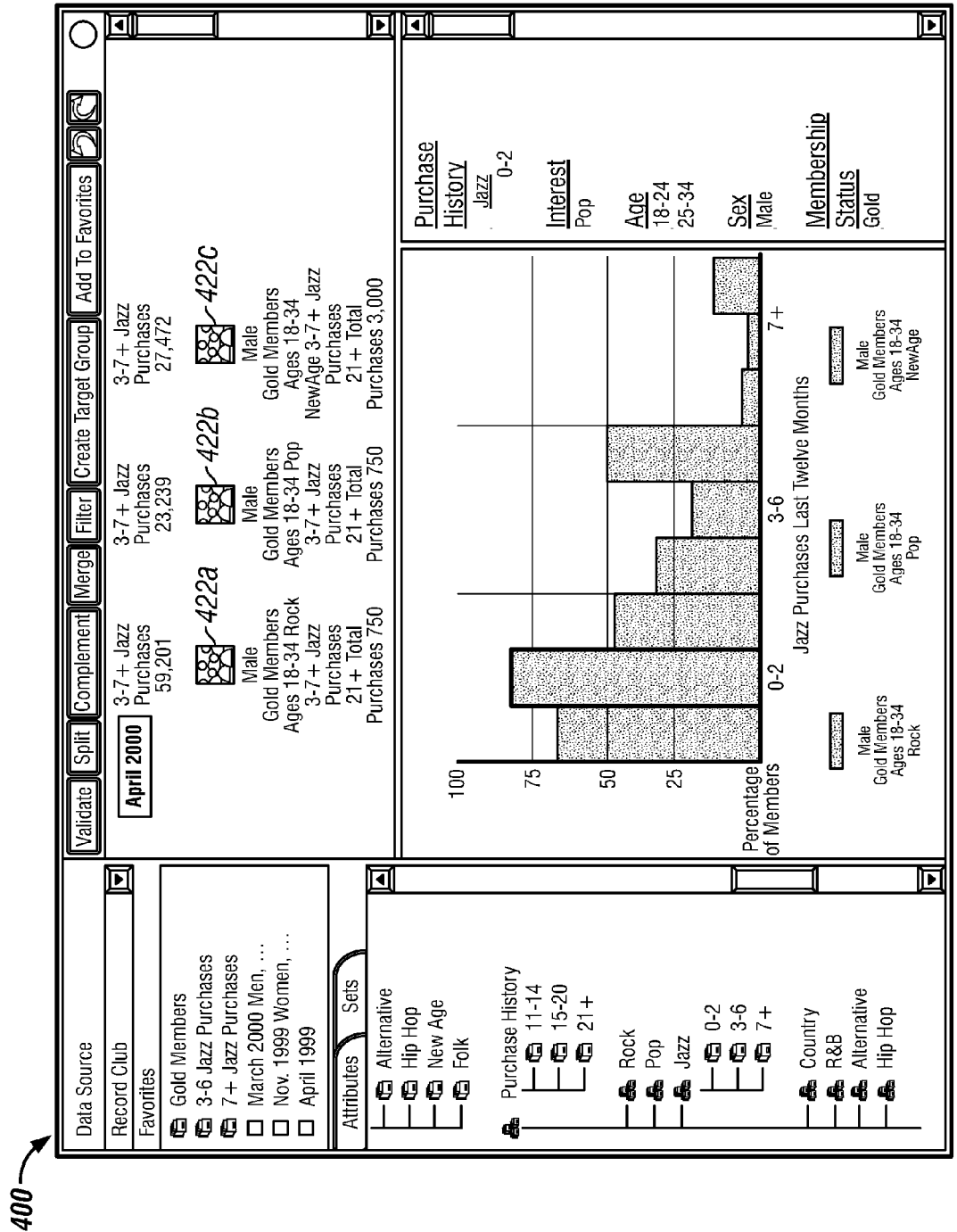

FIG. 20 illustrates an example GUI 400 that is presented to the user when the graphical representations 422a, 422b, and 422c are subdivided by using an intersection operation. For instance, the total number of records from the data source represented by the graphical representation 422a, 422b, and 422c have each been subdivided into two groups by intersecting each graphical representation with a data attribute (i.e., the 21+ total purchases data attribute). In addition to an intersection operation, other types of operations may be performed on the graphical representations, such as, for example, a merge operation and a remove operation.

Figure 21:
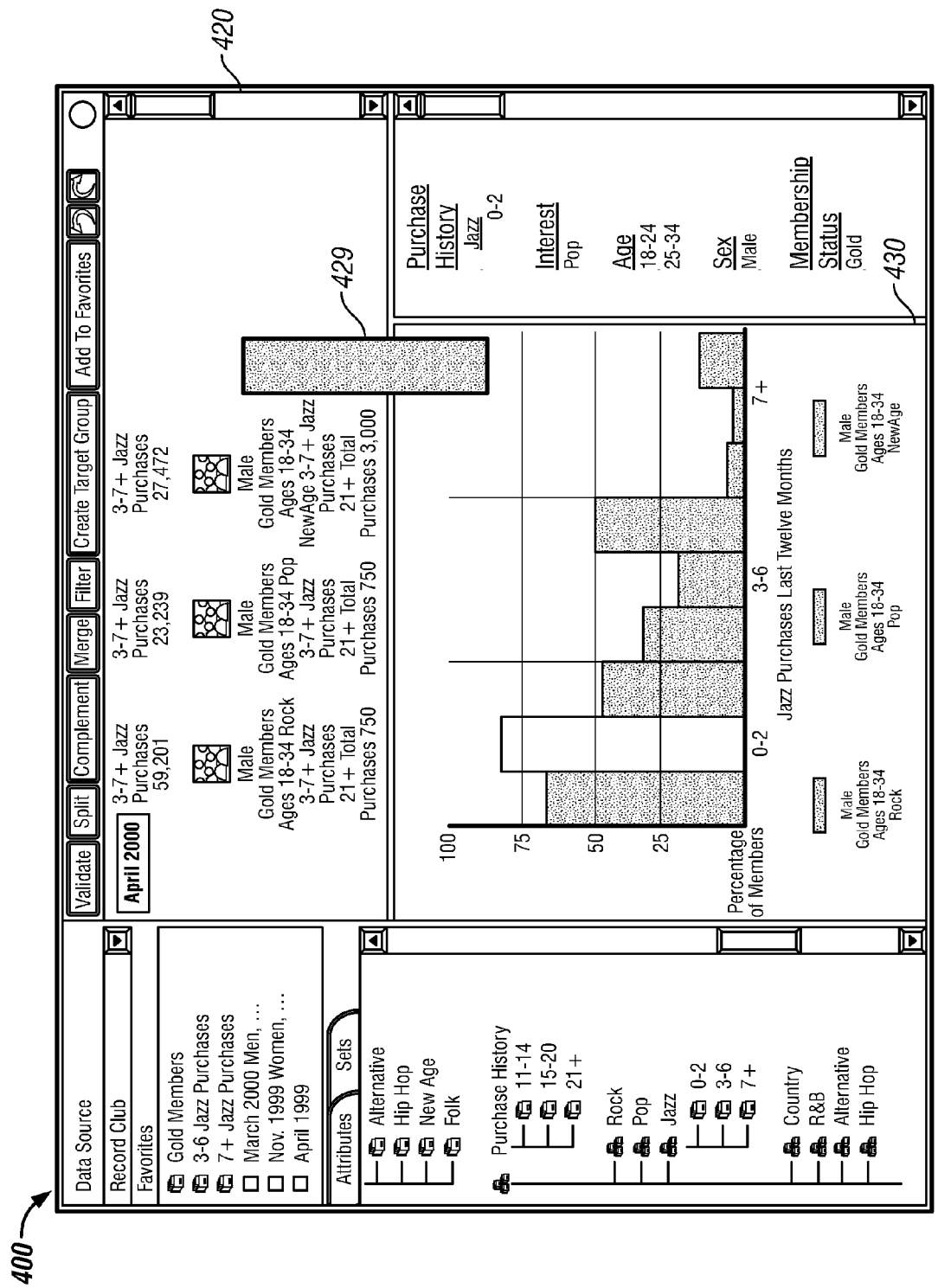
Figure 22:
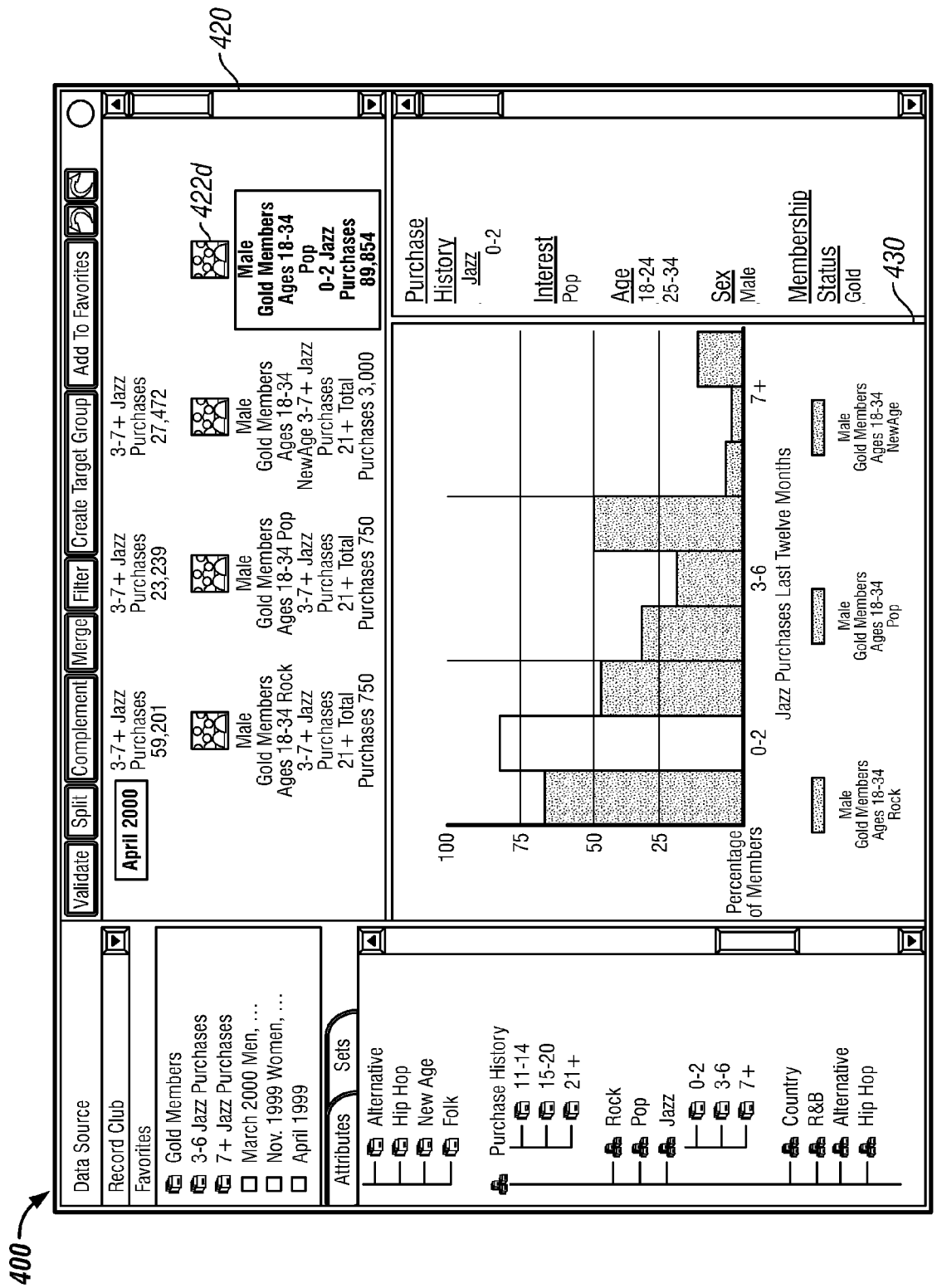

FIGS. 21 and 22 illustrate an example GUI 400 that is presented to the user when a graphical representation 429 is dragged and dropped from the workspace window 430 to the staging window 420. Graphical representation 429 represents records from the data source that have the following data attributes: male, gold members, ages 18-34, pop, and 0-2 jazz purchases. In FIG. 21, the graphical representation 429 is dragged from the workspace window 430 to the staging window 420. In FIG. 22, the graphical representation 429 is dropped in the staging window 420 and a new graphical representation 422d is created in the staging window 420. The graphical representation 422d indicates a number of records from the data source having those particular data attributes. When the graphical representation 422d is created in the staging window 420, the user receives substantially real-time feedback as to the number of records from the data source having those particular data attributes.

Figure 23:
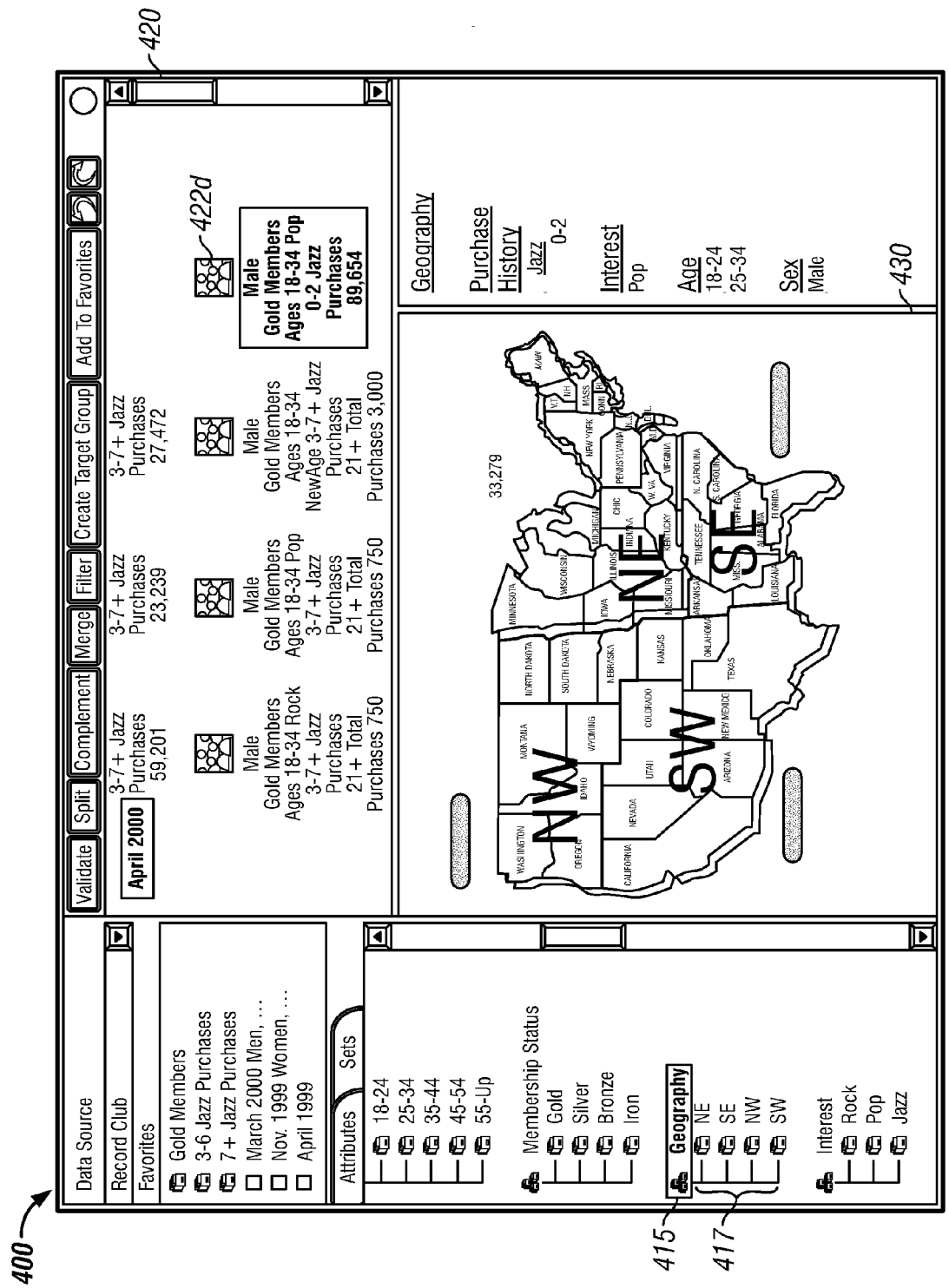

FIG. 23 illustrates an example GUI 400 that is presented to the user when a data attribute category 415 is selected with one of graphical representations 422d having been selected in the staging window 420. When the data attribute category 415 is selected, the workspace window 430 displays a graphical representation of the data attribute category 415 and the data attributes 417 within that category as they relate to the selected graphical representation 422d. When the data attribute category 415 is selected, the workspace window 430 provides substantially real-time feedback to the user as to the number of records in the data source for the selected data attribute category 415 as related to the selected graphical representation 422d from the staging window 420.

Figure 24:
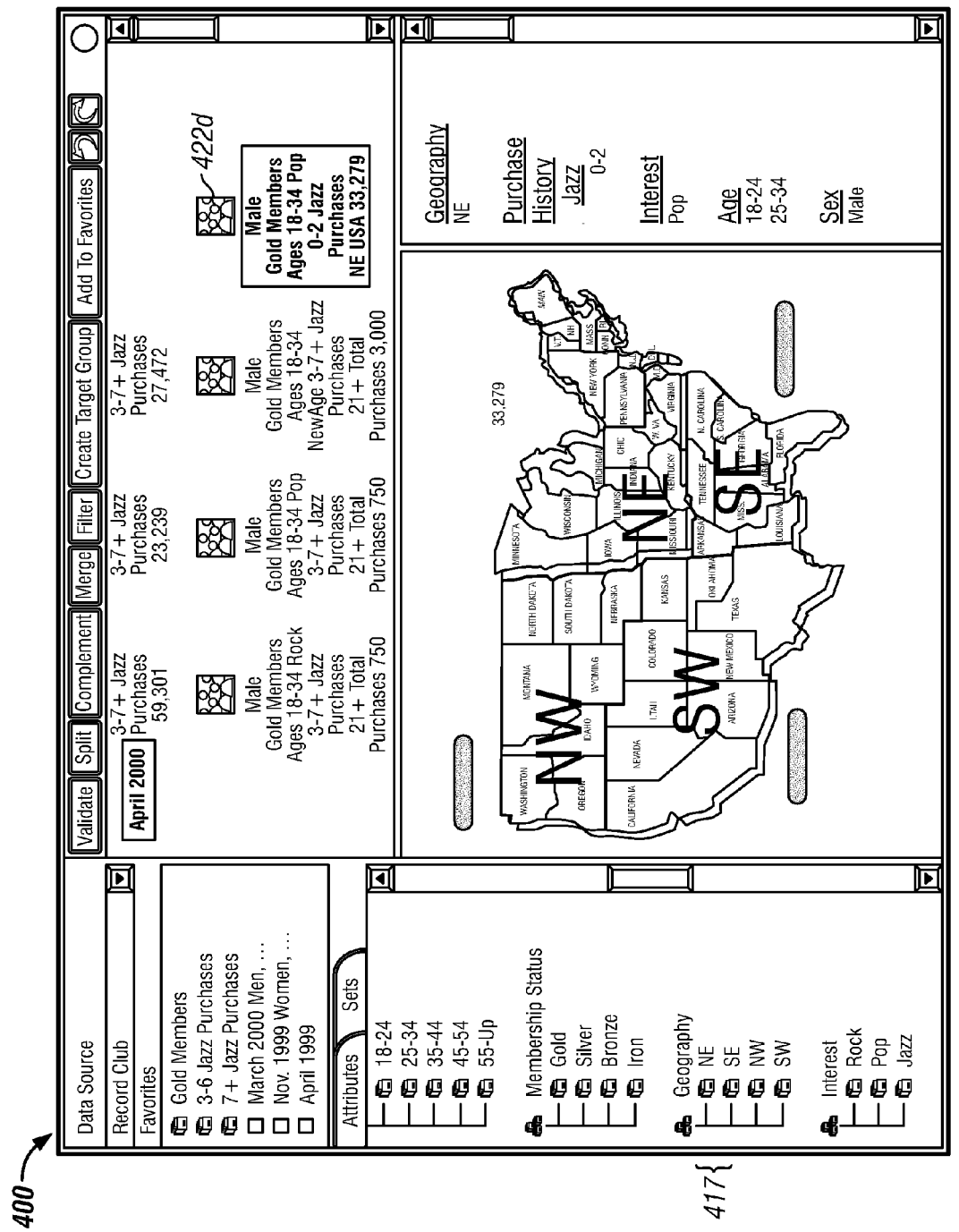

FIG. 24 illustrates an example GUI 400 that is presented to the user when one of several graphical representations 422d are selected and updated with a data attribute 417. In this example, the selected graphical representation 422d is updated to include the "NE" data attribute.

Figure 25:
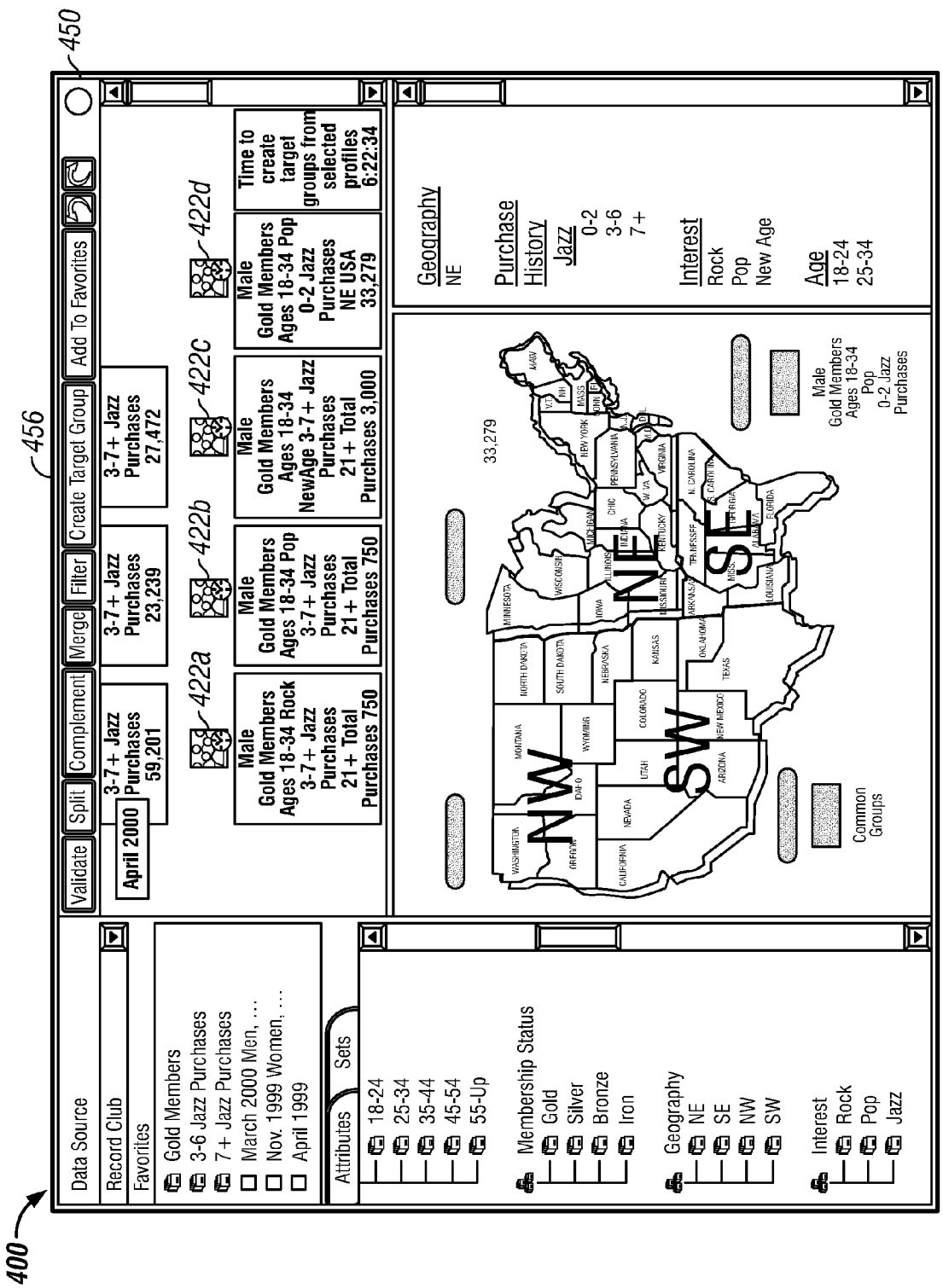
Figure 26:
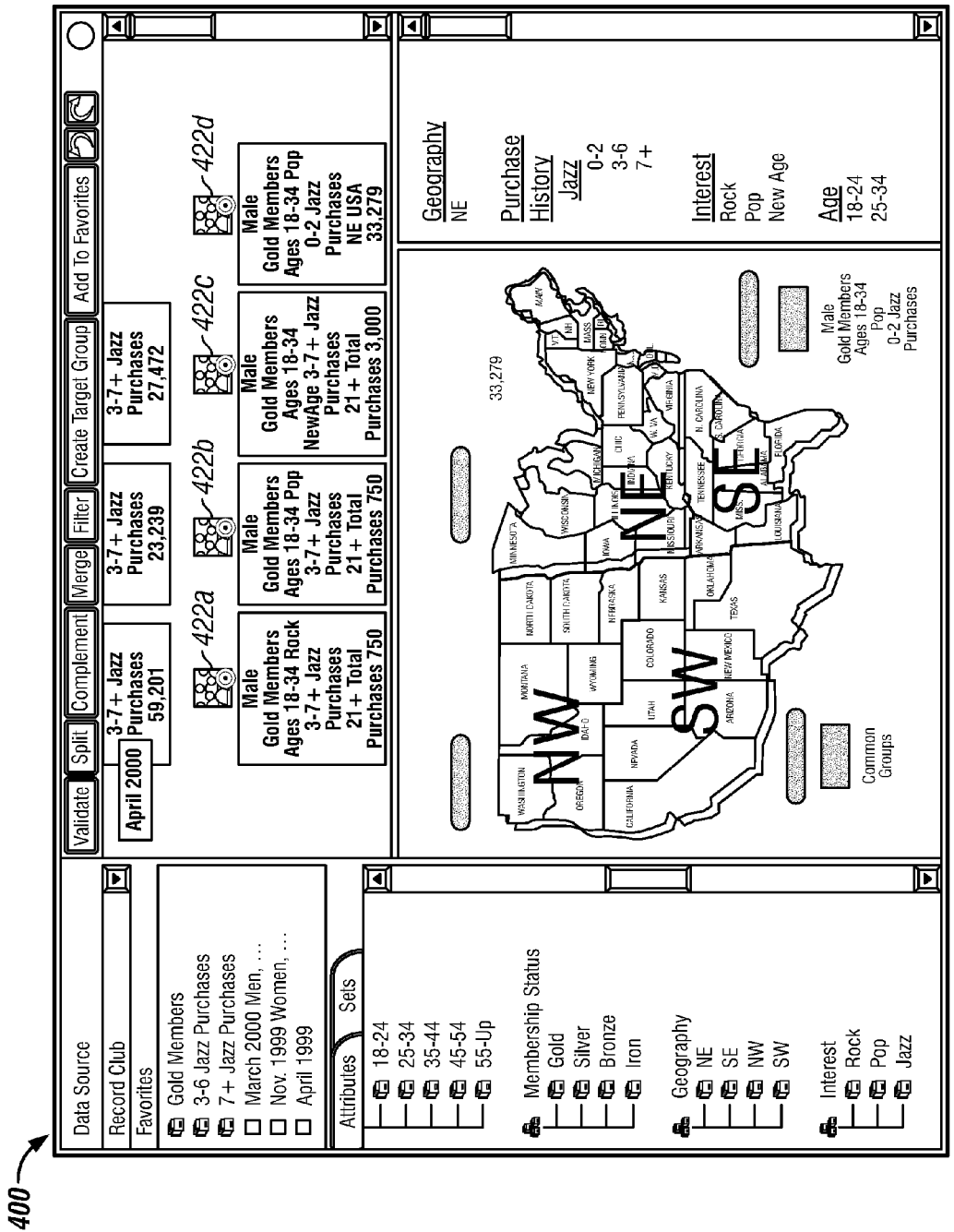

FIGS. 25 and 26 illustrate an example GUI 400 that is presented to the user when performing an operation to one or more selected graphical representation 422a, 422b, 422c, and 422d. In FIG. 25, all of the graphical representations 422a, 422b, 422c, and 422d are selected and the "Create Target Group" button 456 from the toolbar 450 is selected. The graphical representations 422a, 422b, 422c, and 422d are updated to indicate to the user that an operation is being performed on the selected graphical representations 422a, 422b, 422c, and 422d. In FIG. 26, the graphical representations 422a, 422b, 422c, and 422d are again updated to indicate that the operation has been completed. In this example, the graphical representations 422a, 422b, 422c, and 422d indicate that target groups have been created from the selected graphical representations 422a, 422b, 422c, and 422d. In the marketing context, a target group may be a specific list of names used as the contact list in a marketing campaign.

Figure 27:
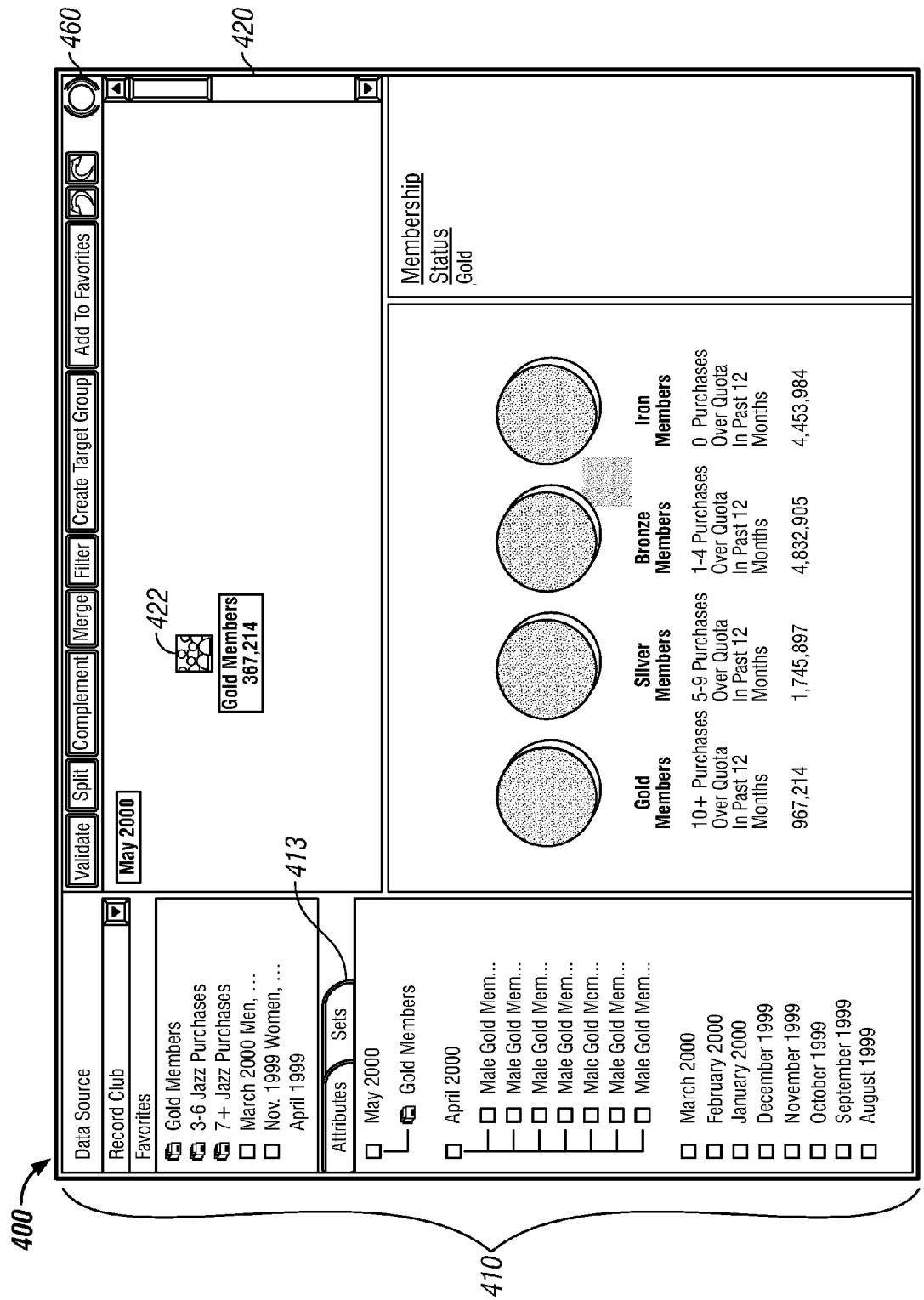

In one implementation, alerts may be used to indicate to the user that operations have already been performed relating to one or more data attributes and saved as a set in the data source. This alert feature may save the user time by permitting use of a saved set instead of requiring performance of the operations needed to obtain the same results represented by the set. For example, in the marketing context, FIG. 27 illustrates the alert 460 that is triggered when the graphical representation 422 is created in the staging window 420. This alerts the user that target groups or other operations have been performed and saved under the "Sets" tab 413 in the components window 410 that are related to the graphical representation 422. Selecting the "Sets" tab 413 reveals that a number of target groups have already been created that include the data attribute "Gold member." This may save the user time because the user can drag and drop one of the already created target groups into the staging area 420 and either use that target group as the end result or further update that target group without having to start at the beginning.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A computer-implemented method for selecting a target audience for a marketing campaign using a graphical user interface, the method comprising:
creating, in a first window on a display device of a computer, a graphical representation of an initial audience profile, wherein: the initial audience profile comprises a first number of content records, a content record representing a potential target for a marketing campaign, and the graphical representation of the initial audience profile indicates the first number of contact records;
presenting, in a second window on the display device of the computer, graphical representations of data attributes, wherein: a data attribute represents a valid entry in a contact record;
receiving a first user input that represents a selection of a graphical representation of a data attribute presented in the second window;
after receiving the first user input, presenting an action area in the first window of the display device of the computer, wherein the action area represents an operation that can be performed on the initial audience profile using the selected data attribute;
receiving a second user input that represents a selection of the presented action area;
performing the operation represented by the selected action area on the initial audience profile using the selected data attribute to determine an updated audience profile that comprises a second number of content records; and
presenting, in the first window of the display device of the computer, a graphical representation of the updated audience profile that indicates the second number of content records.

2. The method as in claim 1 wherein creating the initial audience profile includes creating the initial audience profile by a user action.

3. The method as in claim 1 wherein creating the initial audience profile includes creating the initial audience profile by a default action.

4. The method as in claim 1 further comprising generating a list of names with corresponding contact information from the updated audience profile.

* * * * *